United States Patent
Wang et al.

(10) Patent No.: US 8,675,764 B2
(45) Date of Patent: Mar. 18, 2014

(54) METHOD AND APPARATUS FOR GENERATING A PRECODING MATRIX CODEBOOK GROUP

(75) Inventors: Jian Wang, Beijing (CN); Jun Tian, Beijing (CN); Jianming Wu, Beijing (CN); Yuantao Zhang, Beijing (CN)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/372,900

(22) Filed: Feb. 14, 2012

(65) Prior Publication Data

US 2012/0140810 A1 Jun. 7, 2012

Related U.S. Application Data

(63) Continuation of application No. PCT/CN2010/070381, filed on Jan. 27, 2010.

(30) Foreign Application Priority Data

Aug. 17, 2009 (CN) .......................... 2009 1 0167422

(51) Int. Cl.
*H04B 7/02* (2006.01)

(52) U.S. Cl.
USPC ....................................................... 375/267

(58) Field of Classification Search
USPC .......... 370/210, 329, 338, 344; 375/227, 239, 375/260, 267, 285, 296, 299, 347, 349; 455/69, 101, 132–141; 700/53; 704/219
See application file for complete search history.

(56) References Cited

U.S. PATENT DOCUMENTS

| 2008/0159425 | A1* | 7/2008 | Khojastepour et al. | 375/260 |
| 2008/0186212 | A1* | 8/2008 | Clerckx et al. | 341/55 |
| 2008/0225962 | A1 | 9/2008 | Zhou et al. | |
| 2009/0122857 | A1 | 5/2009 | Li et al. | |
| 2009/0323841 | A1* | 12/2009 | Clerckx et al. | 375/260 |
| 2011/0150114 | A1* | 6/2011 | Miao et al. | 375/260 |

FOREIGN PATENT DOCUMENTS

| CN | 1890908 | 1/2007 |
| CN | 101136718 | 3/2008 |
| CN | 101212438 | 7/2008 |
| CN | 101277172 | 10/2008 |

(Continued)

OTHER PUBLICATIONS

International Search Report issued for corresponding International Patent Application No. PCT/CN2010/070381, mailed May 20, 2010.

(Continued)

*Primary Examiner* — Sam K Ahn
*Assistant Examiner* — Shawkat M Ali
(74) *Attorney, Agent, or Firm* — Myers Wolin, LLC

(57) ABSTRACT

A method and an apparatus for generating a precoding matrix codebook group are provided by the present invention. The method includes: a step for generating a channel matrix set; a step for generating a performance parameter matrix; and a step for generating a precoding matrix codebook group: based on the generated performance parameter matrix, according to contribution of every precoding matrix to the performance parameter of the communication system, ranking the precoding matrices in precoding matrix universal set, so as to achieve an ordered precoding matrix universal set as the precoding matrix codebook group. A method for assigning a precoding matrix for a multi-antenna communication system, a method for transmitting data for a multi-antenna communication system, a base station and a mobile station thereof are provided by the present invention.

20 Claims, 10 Drawing Sheets

(56) References Cited

FOREIGN PATENT DOCUMENTS

| CN | 101394254 | 3/2009 |
|---|---|---|
| EP | 1 919 097 | 5/2008 |
| JP | 2009-225130 | 10/2009 |
| WO | 2007/133564 | 11/2007 |
| WO | 2008/144189 | 11/2008 |
| WO | 2009/023681 | 2/2009 |
| WO | 2009/096145 | 8/2009 |

OTHER PUBLICATIONS

Notification of the First Office Action issued for corresponding Chinese Patent Application No. 200910167422.7, dated Feb. 20, 2013 with English translation.

* cited by examiner

Apparatus for generating a precoding matrix codebook group 1000

Performance parameter matrix generating unit 1020

Precoding matrix codebook group generating unit 1030

Apparatus for generating a precoding matrix codebook group 1300

Apparatus for generating a precoding matrix codebook group 1400

METHOD AND APPARATUS FOR GENERATING A PRECODING MATRIX CODEBOOK GROUP

CROSS REFERENCE TO RELATED APPLICATIONS

This is a continuation of Application No. PCT/CN2010/070381, filed on Jan. 27, 2010, now pending, which claims priority to Chinese Patent Application No. 200910167422.7, filed on Aug. 17, 2009, the contents of both are herein wholly incorporated by reference.

FIELD OF THE INVENTION

The application generally relates to a wireless communication system, and particularly to a method and an apparatus for generating a precoding matrix codebook group for a multi-antenna communication system, a method for specifying a precoding matrix for a multi-antenna communication system, a data transmission method for a multi-antenna communication system, and a base station and a mobile station for a multi-antenna communication system.

BACKGROUND OF THE INVENTION

By now, wireless communication systems have been developed rapidly. The traditional second-generation mobile communication system, i.e. Global System for Mobile Communication (GSM), is continuously evolving toward General Packet Radio Service (GPRS) and Enhanced Data Rates for GSM Evolution (EDGE), to greatly improve data transmission capacity of the system. The third-generation mobile communication system with a higher transmission rate, such as Wideband Code Division Multiple Access (WCDMA) and CDMA2000, has been deployed in many countries and regions worldwide for starting to be put into commercial use. During the development of cellular communication technology, other wireless access technologies, such as Wireless LAN (WLAN) and Worldwide Interoperability for Microwave Access (WiMAX) technology, have been developed rapidly. In addition, an IEEE 802.16m technology facing the fourth-generation mobile communication system, a Third-Generation Partnership Project Long Term Evolution (3GPP LTE) technology and a Third-Generation Partnership Project Long Term Evolution-Advanced (3GPP LTE-Advanced) technology have entered into a research and development stage.

A multi-antenna system for MIMO (Multi-input Multi-output) can offer large increases in throughput due to its ability to support parallel data stream transmission, and draws more and more attention in academic researches and practical systems. Generally, in multi-antenna transmission, the parallel data streams are suffered to coding with forward error correction codes separately, and then the coded code words are mapped onto one or more transmission layers. To map the coded words onto multiple transmission layers, the serial data output from a coder are converted into parallel data on the respective layers. The number of all layers supported by the system in one transmission is also referred to as a rank (Rank) of the system.

Generally, the number of the transmission layers or the rank supported by the multi-antenna system is less than or equal to the number of physical antennas of the multi-antenna system. The process for transforming the data on the layers into data on the physical antennas is called as "pre-encoding" of a signal. In particular, the process for transforming the data on the layers into the data on the physical antennas by a linear operation is called as "linear pre-encoding" of the signal. In the existing wireless communication systems such as an LTE system and a WiMax system, it is needed to design a certain number of precoding matrices in advance for the system due to limitations in computational complexity and signaling control complexity of the system. A set of precoding matrices is called as a precoding matrix codebook, and the number of the precoding matrices in the precoding matrix codebook is called as the size of the precoding matrix codebook. In a multi-antenna system, the performance index of the system, such as throughput, is influenced directly by the precoding matrix codebook as well as the size of the precoding matrix codebook and the elements of the codebook precoding matrix book. Therefore, in order to maximize the throughput of the system, it is necessary to design the precoding matrix codebook of the multi-antenna system, including the size of the precoding matrix codebook and the precoding matrix elements of the precoding matrix codebook.

SUMMARY OF THE INVENTION

A brief summary of the present invention is given hereinafter, so as to provide basic understanding on some aspects of the present invention. It should be understood that, the summary is not an exhaustive summary of the present invention. It neither intends to identify the critical or important part of the invention, nor intends to limit the scope of the present invention. It only aims to present some concepts in a simplified form as a prelude to the more detailed description to be discussed later.

According to one aspect of the present invention, there is provided a method for generating a precoding matrix codebook group for a multi-antenna communication system. The method includes: a channel matrix set generating step: generating a channel matrix set including N channel matrices, wherein N is an integer larger than 1 and each of the channel matrices corresponds to a channel instance; a performance parameter matrix generating step: generating a M×N performance parameter matrix TP based on the channel matrix set and a precoding matrix collection including M precoding matrices, wherein M is a positive integer, each row of the performance parameter matrix TP represents the values of a performance parameter of the communication system associated with the same precoding matrix, and each column of the performance parameter matrix TP represents the values of the performance parameter associated with the same channel matrix; and a precoding matrix codebook group generating step: ordering, based on the performance parameter matrix TP, the precoding matrices in the precoding matrix collection according to a contribution made by each of the precoding matrices to the performance parameter of the communication system to obtain an ordered precoding matrix collection as the precoding matrix codebook group.

According to another aspect of the present invention, there is provided a method for specifying a precoding matrix for a multi-antenna communication system. The multi-antenna communication system includes at least one base station and at least one mobile station. The method includes: a precoding matrix selecting step: selecting, by the base station from at least one precoding matrix codebook group stored on the base station, a precoding matrix to be specified for communication between the base station and the mobile station, according to information of a signal received from the mobile station, wherein each precoding matrix codebook group corresponds to a transmission layer of the communication system; a downlink signaling generating step: generating, based on the selected precoding matrix, downlink signaling which contains information indicating the selected precoding matrix; and a downlink signaling transmitting step: transmitting the generated downlink signaling to the mobile station, wherein all precoding matrices in each precoding matrix codebook group are ordered according to the contribution made by each of the precoding matrices in a precoding matrix collection having a size of M matrices to a performance parameter of the communication system, M being a positive integer, and wherein in the precoding matrix codebook group, the precoding matrix making a first largest contribution to the performance parameter of the communication system forms a precoding matrix codebook having a size of 1 matrix, and the first K precoding matrices respectively making a first largest to a $K^{th}$ largest contribution to the performance parameter of the communication system form a precoding matrix codebook having a size of K matrices, wherein K is an integer and $1<K \leq M$.

According to another aspect of the present invention, there is provided a data transmission method for a multi-antenna communication system. The multi-antenna communication system includes at least one base station and at least one mobile station. The method includes: a downlink signaling receiving step: receiving, by the mobile station, downlink signaling from the base station, wherein the downlink signaling contains information indicating a precoding matrix specified by the base station and to be used for communication between the base station and the mobile station; a precoding matrix obtaining step: obtaining, from at least one precoding matrix codebook group stored on the mobile station, the precoding matrix according to the information indicating the precoding matrix, wherein each precoding matrix codebook group corresponds to a transmission layer of the communication system; and a precoding step: precoding data to be transmitted to the base station by using the obtained precoding matrix, wherein all precoding matrices in each precoding matrix codebook group are ordered according to the contribution made by each of the precoding matrices in a precoding matrix collection having a size of M matrices to a performance parameter of the communication system, M being a positive integer, and wherein in the precoding matrix codebook group, the precoding matrix making a first largest contribution to the performance parameter of the communication system forms a precoding matrix codebook having a size of 1 matrix, and the first K precoding matrices respectively making a first largest to a $K^{th}$ largest contribution to the performance parameter of the communication system form a precoding matrix codebook having a size of K matrices, wherein K is an integer and $1<K \leq M$.

According to another aspect of the present invention, there is provided an apparatus for generating a precoding matrix codebook group for a multi-antenna communication system. The apparatus includes: a channel matrix set generating unit, configured to generate a channel matrix set including N channel matrices, wherein N is an integer larger than 1 and each of the channel matrices corresponds to a channel instance; a performance parameter matrix generating unit, configured to generate a M×N performance parameter matrix TP based on the channel matrix set and a precoding matrix collection including M precoding matrices, wherein M is a positive integer, each row of the performance parameter matrix TP represents the values of a performance parameter of the communication system associated with the same precoding matrix, and each column of the performance parameter matrix TP represents the values of the performance parameter associated with the same channel matrix; and a precoding matrix codebook group generating unit, configured to order, based on the performance parameter matrix TP, the precoding matrices in the precoding matrix collection according to the contribution made by each of the precoding matrices to the performance parameter of the communication system to obtain an ordered precoding matrix collection as the precoding matrix codebook group.

According to another aspect of the present invention, there is provided a base station for a multi-antenna communication system. The multi-antenna communication system includes the base station and at least one mobile station. The base station includes: a storing unit, configured to store at least one precoding matrix codebook group, wherein each precoding matrix codebook group corresponds to a transmission layer of the communication system; a precoding matrix selecting unit, configured to select, from the precoding matrix codebook group stored on the storing unit, a precoding matrix to be specified for the communication between the base station and the mobile station, according to information of a signal received from the mobile station; a downlink signaling generating unit, configured to generate, based on the selected precoding matrix, downlink signaling which contains information indicating the selected precoding matrix; and a downlink signaling transmitting unit, configured to transmit the generated downlink signaling to the mobile station, wherein all precoding matrices in each precoding matrix codebook group are ordered according to the contribution made by each of the precoding matrices in a precoding matrix collection having a size of M matrices to a performance parameter of the communication system, M being a positive integer, and wherein in the precoding matrix codebook group, the precoding matrix making a first largest contribution to the performance parameter of the communication system forms a precoding matrix codebook having a size of 1 matrix, and the first K precoding matrices respectively making a first largest to a $K^{th}$ largest contribution to the performance parameter of the communication system form a precoding matrix codebook having a size of K matrices, wherein K is an integer and $1<K \leq M$.

According to another aspect of the present invention, there is provided a mobile station for a multi-antenna communication system. The multi-antenna communication system includes the mobile station and at least one base station. The mobile station includes: a storing unit, configured to store at least one precoding matrix codebook group, wherein each precoding matrix codebook group corresponds to a transmission layer of the communication system; a downlink signaling receiving unit, configured to receive downlink signaling from the base station, wherein the downlink signaling contains information indicating a precoding matrix specified by the base station and to be used for communication between the base station and the mobile station; a precoding matrix obtaining unit, configured to obtain, from the precoding matrix codebook group stored on the storing unit, the precoding matrix according to the information indicating the precoding matrix; and a precoding unit, configured to precode data to be transmitted to the base station by using the obtained precoding matrix, wherein all precoding matrices in each precoding matrix codebook group are ordered according to the contribution made by each of the precoding matrices in a precoding matrix collection having a size of M matrices to a performance parameter of the communication system, M being a positive integer, and wherein in the precoding matrix codebook group, the precoding matrix making a first largest contribution to the performance parameter of the communication system forms a precoding matrix codebook having a size of 1 matrix, and the first K precoding matrices respectively making a first largest to a $K^{th}$ largest contribution to the performance parameter of the communication system form a precoding matrix codebook having a size of K matrices, wherein K is an integer and $1<K\leq M$.

According to another aspect of the present invention, there is provided a storage medium. The storage medium includes machine-readable program codes. The program codes, when being executed on an information processing device, allow the information processing device to perform one or more of the above methods according to the present invention.

According to another aspect of the present invention, there is provided a program product. The program product includes machine-executable instructions. The instructions, when being executed on an information processing device, allow the information processing device to perform one or more of the above methods according to the present invention.

The precoding matrix codebook group generated according to the methods and apparatuses of the present invention has a nesting feature. The mobile station and the base station can select, according to the situation of Signal to Noise Ratio (SNR) of the system, an optimal precoding matrix which allows a performance parameter of the system to be the maximum.

In addition, the downlink signaling transmitted from the base station to the mobile station contains information indicating a precoding matrix and information indicating a precoding matrix number allocation solution, and needs not to contain the entire precoding matrix, thus minimizing the communication overhead.

In addition, in the base station and mobile station, only a precoding matrix codebook having a maximum size is retained for each rank, thus saving storage space greatly.

The above and other advantages will be more apparent by the detailed description of preferred embodiments of the present invention hereinafter with reference to drawings.

BRIEF DESCRIPTION OF THE DRAWINGS

The above and other objects, features and advantages of the present invention will be better understood with reference to the description given hereinafter in conjunction with the accompanying drawings. In all the drawings, the same or similar references signs indicate the same or similar parts. In the drawings.

DETAILED DESCRIPTION OF THE INVENTION

Figure 1:
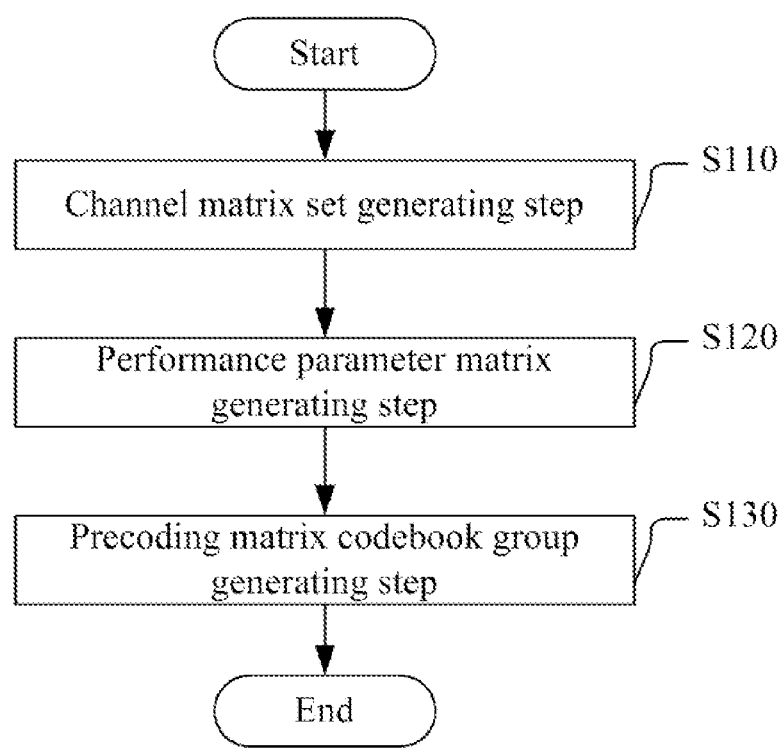
FIG. 1 shows a flowchart of a method for generating a precoding matrix codebook group according to an embodiment of the present invention.

Exemplary embodiments of the present invention are described hereinafter with reference to the drawings. For clarity and concision, not all features of the actual embodiments are described in the description. However, it should be understood that, many decisions specific for the embodiments will be done during development of the embodiments, in order to achieve the specific target of the developers, for example, to satisfy restrictions associated with the system and services which are likely to change with different embodiments. In addition, it should be understood that although the development may be very complex and time-consuming, the development is just a routine task for those skilled in the art who benefit from the present disclosure.

It should be noted here that, in order to avoid the present invention from being obscured due to unnecessary details, only apparatus structures and/or processing steps that are closely related to the solutions of the present invention are shown in the drawings and other details not so closely related to the present invention are omitted.

Precoding Matrix Collection

A precoding matrix codebook is formed by one or more precoding matrices. Therefore, a situation for designing a precoding matrix codebook and a precoding matrix codebook group is that there exists a collection of precoding matrices from which the precoding matrices for generating the precoding matrix codebook and the precoding matrix codebook group can be selected. Those skilled in the art should understand that, the collection of precoding matrices satisfying the design conditions can be achieved by using various existing technologies.

An example of the precoding matrix collection according to an embodiment of the present invention is given hereinafter. Each precoding matrix in the precoding matrix collection has the following form: $[1, 1, \ldots 1; x_{11}, x_{12}, \ldots, x_{1q}; x_{21}, x_{22}, \ldots, x_{2q}; \ldots, \ldots, \ldots, \ldots; x_{p1}, x_{p2}, \ldots, x_{pq}]$, where p is an integer and $1 \leq p \leq P$, q is an integer and $1 \leq q \leq Q$, P represents the number of the transmitting antennas in the communication system and Q represents the rank of the communication system. As mentioned above, the number of all the layers supported by the system in one transmission is also known as a rank of the system. Those skilled in the art should understand that the precoding matrix collection given here is only an example and does not intend to limit the present invention. Other forms of precoding matrix collection can also be used to provide the precoding matrices for generating the precoding matrix codebook and the precoding matrix codebook group.

For facilitating illustration, a 4-antenna system is taken as an example hereinafter to illustrate the forming of a precoding matrix collection according to an embodiment of the present invention. In such a system, the number of the layers supported by the system can be 1, 2, 3 or 4, that is, the rank can be 1, 2, 3 or 4.

As an example, when the rank is 1, a precoding matrix p has a form of $[1; x_{11}; x_{21}; x_{31}]$. For example, the precoding matrix collection can be formed by one or more of the following types of precoding matrices satisfying this form.

From a DFT (Discrete Fourier Transform) matrix, 4 precoding matrices can be obtained, wherein each of the precoding matrices corresponds to a column of the DFT matrix.

From a Hadamard matrix, 4 precoding matrices can be obtained, wherein each of the precoding matrices corresponds to a column of the Hadamard matrix.

In addition, $x_{11}$, $x_{21}$ and $x_{31}$ can be QPSK constellation points, 8PSK constellation point, 16PSK constellation points or PSK constellation points with more dimensions.

For example, if $x_{11}$, $x_{21}$, $x_{31}$ are QPSK constellation points, the total number of the precoding matrices that can be obtained satisfying the above form is 4×4×4=64.

For another example, if $x_{11}$, $x_{21}$, $x_{31}$ are 8PSK constellation points, the total number of the precoding matrices that can be obtained satisfying the above form is 8×8×8=512.

As another example, if $x_{11}$, $x_{21}$, $x_{31}$ are 16PSK constellation points, the total number of the precoding matrices that can be obtained satisfying the above form is 4×4×4=4096.

Of course, there may be other forms of precoding matrices with Rank=1.

According to the requirements of the system, one, or several, or all forms of precoding matrices as described above, or power normalization matrices thereof can be used as the collection of the precoding matrices with Rank=1.

As another example, when Rank=2, the precoding matrix p has a form of $[1\ 1;\ x_{11}\ x_{12};\ x_{21}\ x_{22};\ x_{31}\ x_{32}]$. Similarly, the precoding matrix collection can be formed by one or more of the following types of precoding matrices. In addition, as an example, p is a unitary matrix, i.e. $p^H \times p = \alpha I$, where $\alpha$ is a scalar.

From a DFT matrix, 6 precoding matrices can be obtained, wherein each of the precoding matrices corresponds to two columns selected from the DFT matrix.

From a Hadamard matrix, 6 precoding matrices can be obtained, wherein each of the precoding matrices corresponds to two columns selected from the Hadamard matrix.

In addition, $x_{11}\ x_{12}\ x_{21}\ x_{22}\ x_{31}\ x_{32}$ in the precoding matrix p can be QPSK constellation points, 8PSK constellation points, 16PSK constellation points or PSK constellation points with more dimensions.

For example, if $x_{11}\ x_{12}\ x_{21}\ x_{22}\ x_{31}\ x_{32}$ are QPSK constellation points, the total number of the precoding matrices that can be obtained satisfying the above form is 288.

For another example, if $x_{11}\ x_{12}\ x_{21}\ x_{22}\ x_{31}\ x_{32}$ are 8PSK constellation points, the total number of the precoding matrices that can be obtained satisfying the above form is 5376.

As another example, if $x_{11}\ x_{12}\ x_{21}\ x_{22}\ x_{31}\ x_{32}$ are 16PSK constellation points, the total number of the precoding matrices that can be obtained satisfying the above form is 92160.

Of course, there may be other forms of precoding matrices with Rank=2.

According to the requirements of the system, one, or several, or all forms of precoding matrices described above, or power normalization matrices thereof can be used as the collection of the precoding matrices with Rank=2.

The cases of Rank=3 and Rank=4 are similar with the above situation, which will not be described in detail herein.

In the case of other antenna configurations, such as a 2-antenna system, a 8-antenna system or a system with more antennas, the process of forming a precoding matrix collection is similar to the process of forming the precoding matrix collection for the 4-antenna system described above, which will not be described in detail herein.

For facilitating illustration in the following, it is assumed that the existing or formed precoding matrix collection is P, which has M elements, each element is $P_m$, M and m are positive integers, and $1 \leq m \leq M$.

Method for Generating a Precoding Matrix Codebook Group

A method for generating a precoding matrix codebook group according to embodiments of the present invention is illustrated hereinafter with reference to the drawings.

FIG. 1 shows a flowchart of a method for generating a precoding matrix codebook group according to an embodiment of the present invention. In the method shown in FIG. 1, a channel matrix set is firstly generated; next a performance parameter matrix is generated based on the channel matrix set and the precoding matrix collection; and then the precoding matrix codebook group is generated based on the formed performance parameter matrix.

In step S110, a channel matrix set $H=[H_1, H_2, H_3, \ldots, H_N]$ is generated, where N is an integer greater than 1. Each channel matrix $H_n$ ($1 \leq n \leq N$) corresponds to a channel instance. Because of the channel randomness, the number N of elements in the channel matrix set H should be large enough to reflect the statistical properties on the channel.

Those skilled in the art should understand that, the channel matrix set can be generated in various ways, which will not be described herein. In the following, several common forms of the channel matrix set are illustrated by taking a 4 transmitting antenna-4 receiving antenna system as an example.

For example, for an independent Rayleigh fading channel, the channel instance generated each time is a 4×4 matrix with 4 rows and 4 columns, and elements in this matrix are signals which comply with complex Gaussian distribution and are uncorrelated with each other.

As another example, if considering the correlation between the transmitting antennas and the receiving antennas, it is assumed that the correlation matrix is R, then the channel instance generated each time can be expressed as $H_n = \text{unvec}(R^{1/2} \times \text{vec}(H))$, where H is a Rayleigh fading channel instance randomly generated, vec (H) means to arrange column vectors of the matrix H sequentially into a one-dimension column vector, and unvec operation is an inverse operation of the vec operation.

Of course, there may be channel matrices in other forms and with other statistical properties as well as corresponding generating methods thereof, which will not be described in detail herein.

In step S120, a performance parameter matrix TP is generated. For example, the existing or formed precoding matrix collection P including M precoding matrices is used, where each element in the collection P is $P_m$, M and m are positive integers and 1≤m≤M, and the generated channel matrix set H including N channel matrices is used. In this way, in step S120, a performance parameter matrix TP with M rows and N columns is generated based on the precoding matrix collection and the channel matrix set. Each row of the performance parameter matrix TP represents the values of a performance parameter associated with the same precoding matrix, and each column represents the values of the performance parameter associated with the same channel matrix.

Figure 2:
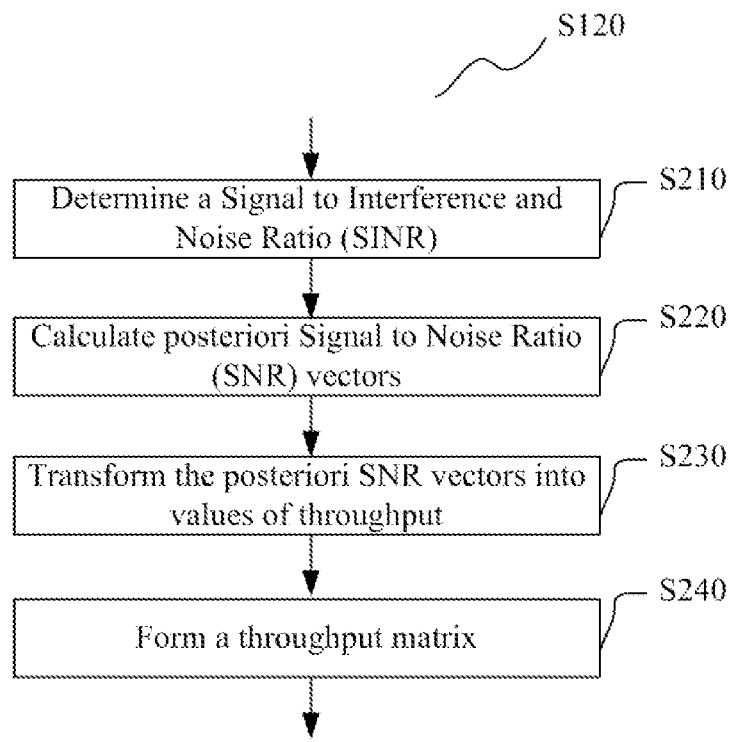
FIG. 2 shows a flowchart of a performance parameter matrix generating step according to an embodiment of the present invention.

FIG. 2 shows a flowchart of performance parameter matrix generating step according to an embodiment of the present invention. In this embodiment, for facilitating illustration, the throughput of the system is used as an example of the performance parameter. Those skilled in the art should understand that, other appropriate performance parameter, such as mutual information of the system, can also be used according to requirements.

As shown in FIG. 2, in the method for generating a performance parameter matrix according to the embodiment of the present invention, Signal to Interference and Noise Ratio (SINR) of the system is determined firstly in step S210. Here, the SINR that the system operates for can be a point such as 0 dB, 5 dB, or 10 dB. Of course, there may be other operation SNR point and other statistical distribution characteristics, which will not be described in detail herein.

Then, in step S220, a posteriori Signal to Noise Ratio (SNR) vector is calculated. A posteriori SNR vector corresponding to each precoding matrix in the precoding matrix collection P is calculated based on the SINR, with respect to each channel instance corresponding to each channel matrix in the channel matrix set H, to obtain M×N posteriori SNR vectors. The posteriori SNR vectors can be calculated with various existing methods by those skilled in the art. As examples, several methods for calculating the posteriori SNR vector are given in the following.

For a single system operation SNR, it is assumed that the normalized noise power thereof is $\sigma^2$, then for a precoding matrix $P_m$ (1≤m≤M), when using a MMSE algorithm, the posteriori SNR vector of $H_n$ is:

$$SNR_{post,n,m} = 1./\text{diag}(\sigma^2 \cdot [\sigma^2 \cdot I + (H_n P_m)^H (H_n P_m)]^{-1}), \quad \text{(Equation 1)}$$

and when using a ZF algorithm, the posteriori SNR vector of $H_n$ is:

$$SNR_{post,n,m} = 1./\text{diag}(\sigma^2 \cdot [(H_n P_m)^H (H_n P_m)]^{-1}). \quad \text{(Equation 2)}$$

In the above algorithms, $SNR_{post,n,m}$ is a column vector, the number of dimensions of which is equal to the number of the columns of the precoding matrix $P_m$.

Of course, there are other decoding methods such as maximum likelihood decoding. Any decoding method will correspond to decoded posteriori SNR vectors, which will not be described in detail herein.

In step S230, the posteriori SNR vectors are transformed into the values of the throughput. Different values of the throughput of the system can be obtained according to different definitions or different algorithms in the prior art.

For example, a system throughput represented by Shannon limit can be obtained by using a Shannon formula.

$$C = \log_2(1+SNR) \quad \text{(Equation 3)}$$

As another example, when QAM modulation and a maximum likelihood decoding method is used in the system, the mutual information corresponding to the modulation scheme can be obtained by a numerical calculation method or a table lookup method, and the values of the throughput of the system can be represented by the mutual information.

As another example, when the QAM modulation and a Max-Log-MAP decoding method is used in the system, the mutual information corresponding to the modulation scheme can be obtained by a numerical calculation method or a table lookup method, and the values of the throughput of the system can be represented by the mutual information As another example, when the link-level Block Error Rate performance of each Modulation and Coding Scheme (MCS) of the system is known, the link-level Block Error Rate performance of each MCS of the system can be transformed into the link-level throughput rate performance of the MCS of the system, so as to obtain the values of the throughput of the system by a table lookup method.

Of course, there are other mapping or calculation methods for mapping or calculating the posteriori Signal to Noise Ratio vectors into the values of the throughput of the system, which will not be described in detail herein.

In order to facilitate subsequent use, in step S240, all the values of the throughput are arranged into a M×N throughput matrix TP, in which each row represents the values of the throughput associated with the same precoding matrix, each column represents the values of the throughput associated with the same channel matrix, and each element represents a value of the throughput of the system when the precoding matrix associated with the row in which the element lies is used under the channel instance corresponding to the channel matrix associated with the column in which the element lies. Of course, the calculated posteriori SNR vectors can be arranged into such a matrix in step S220, so that the values of the throughput of the system calculated in step S230 can be arranged directly in matrix form, without the need to the arrangement process in step S240.

The performance parameter matrix generating step according to an embodiment of the present invention is described above with reference to FIG. 2. Now referring back to FIG. 1, in step S130, a precoding matrix codebook group is generated. The precoding matrices in the precoding matrix codebook collection are ordered based on the performance parameter matrix TP and according to the contribution made by each of the precoding matrices to the performance parameter of the system, so as to obtain an ordered precoding matrix collection as the precoding matrix codebook group. Here, the larger the contribution to the performance parameter of the system is, the better the performance obtained by the system is, and vice versa. For example, when the performance parameter is throughput, the larger the contribution to the throughput is, the larger the throughput obtained by the system is, and vice versa.

One of the objects of the present invention is to generate a precoding matrix codebook group as follows: in the precoding matrix codebook group, the precoding matrix in the ordered precoding matrix collection which makes a first largest contribution to the performance parameter of the system forms a precoding matrix codebook having a size of 1 matrix, and the first K precoding matrices which respectively make a first largest to a $K^{th}$ largest contribution to the performance parameter of the system form a precoding matrix codebook having a size of K matrices, wherein K is an integer and 1<K≤M. The precoding matrix codebook group having the above feature is said to have a nesting feature.

Figure 3:
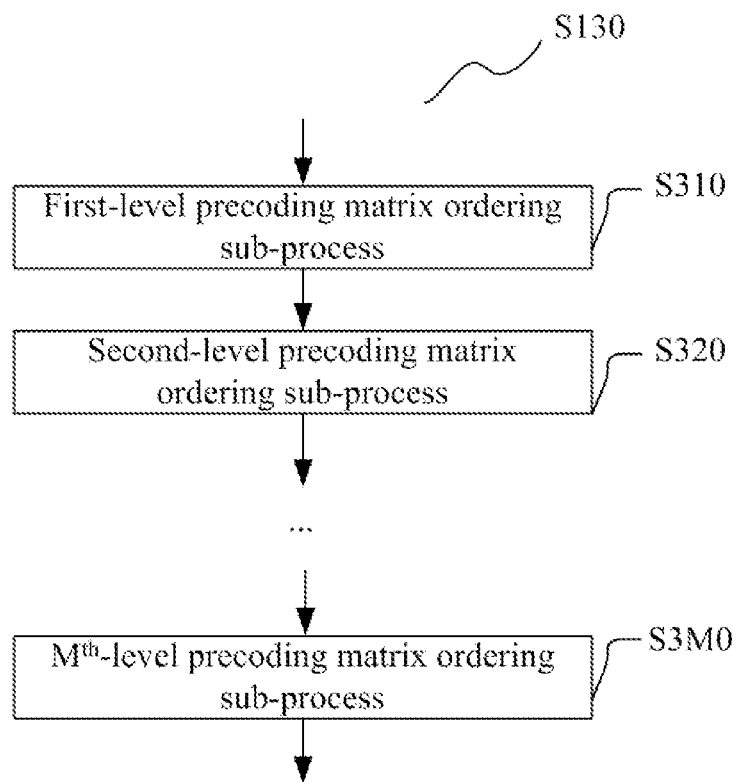
FIG. 3 shows a flowchart of a precoding matrix codebook group generating step according to an embodiment of the present invention.

FIG. 3 shows a flowchart of a precoding matrix codebook group generating step according to an embodiment of the present invention. In step S310 to step S3M0, different levels of precoding matrix ordering sub-process are performed sequentially in order to generate a final precoding matrix codebook group. Understandably, when the precoding matrices in the precoding matrix collection are ordered according to the contribution made by each of the precoding matrices to the performance parameter of the communication system, the precoding matrices can be arranged in descending or ascending order of the contributions in order to allow the ordered precoding matrix codebook group to have the nesting feature.

It is assumed that there exists or forms a precoding matrix collection having M elements, each element is $P_m$, M and m are positive integers, and $1 \leq m \leq M$. It is also assumed that an M×N performance parameter matrix TP is generated, wherein each row represents the values of the performance parameter associated with the same precoding matrix, and each column represents the values of the performance parameter associated with the same channel matrix.

Matrix Deleting Mode

According to an embodiment of the present invention, the precoding matrices in the precoding matrix collection are ordered according to the contribution made by each of the precoding matrices to the performance parameter of the communication system, by the following way: performing a first-level precoding matrix ordering sub-process on the performance parameter matrix TP to determine a precoding matrix which makes a first least contribution to the performance parameter of the communication system; performing a second-level to a $M^{th}$-level precoding matrix ordering sub-process sequentially to determine M−1 precoding matrices which make a second least to a $M^{th}$ least contribution to the performance parameter of the communication system respectively; and ordering all the precoding matrices in the precoding matrix collection according to the contribution made by each of the precoding matrices to the performance parameter to obtain the ordered precoding matrix collection.

Assuming a performance parameter matrix A with K rows and L columns, an operation is made to the matrix A: getting the maximum value $a_l$ of each column of the matrix A, i.e. $a_l = \max(A(:, 1))$, $1 \leq l \leq L$; and adding the L maximum values, i.e. tp (A)=sum $(a_l)$. In the present disclosure, the operation is defined as a performance parameter value acquiring operation on the matrix A.

It is now to describe a performing process of a precoding matrix ordering sub-process according to an embodiment of the present invention.

Taking the performance parameter matrix TP as a first-level performance parameter matrix $TP_1$, the first-level precoding matrix ordering sub-process includes steps of:

(1) deleting the $i^{th}$ row of the first-level performance parameter matrix $TP_1$ to obtain a (M−1)×N performance parameter matrix $TP_{1i}$, wherein i is an integer and $1 \leq i \leq M$;

(2) adding the maximum value of each of the columns of the performance parameter matrix $TP_{1i}$, i.e. performing a performance parameter acquiring operation on the performance parameter matrix $TP_{1i}$, to obtain a value as a performance parameter value of the performance parameter matrix $TP_{1i}$;

(3) repeatedly performing steps (1) and (2) for M times to obtain M performance parameter values of the performance parameter matrix $TP_{1i}$, wherein a different row of the performance parameter matrix $TP_1$ is deleted each time;

(4) assuming that a deleted row corresponding to the largest one of the M performance parameter values is the $x^{th}$ row of the first-level performance parameter matrix $TP_1$, wherein $1 \leq x \leq M$, then determining the precoding matrix in the precoding matrix collection associated with the $x^{th}$ row, as a precoding matrix making a first least contribution to the performance parameter of the system; and (5) deleting the $x^{th}$ row from the first-level performance parameter matrix $TP_1$ to obtain a (M−1)×N performance parameter matrix as a second-level performance parameter matrix $TP_2$.

A second-level precoding matrix ordering sub-process, the steps of which is substantially the same as the steps of the first-level precoding matrix ordering sub-process, is performed on the second-level performance parameter matrix $TP_2$ to determine a precoding matrix making a second least contribution to the performance parameter of the system, and to obtain a (M−2)×N performance parameter matrix as a third-level performance parameter matrix $TP_3$. The steps of the second-level precoding matrix ordering sub-process are substantially the same as the steps of the first-level precoding matrix ordering sub-process, except that the number of the rows of the second performance parameter matrix $TP_2$ is less than the number of the rows of the first-level performance parameter matrix $TP_1$ by one, and thus there is a slight difference on calculation times and the number of the rows of the matrix.

In the same way, a third-level precoding matrix ordering sub-process to a $M^{th}$-level precoding matrix ordering sub-process are performed respectively to determine precoding matrices which respectively make a third least to a $M^{th}$ least contribution to the performance parameter of the system.

Then, the M precoding matrices in the precoding matrix collection P can be ordered according to the contribution made to the performance parameter of the system, so as to obtain an ordered precoding matrix set as the precoding matrix codebook group. In the precoding matrix codebook group formed in this way, there are M precoding matrix codebooks in all. The numbers of elements of the codebooks are respectively 1, 2, 3, ..., M−1, M. In addition, the obtained precoding matrix codebook group has a nesting feature.

In other words, each of the precoding matrices in the precoding matrix codebook having a size of K matrices is an element of a precoding matrix codebook having a size of K+1 matrices. Conversely, in the precoding matrix codebook having a size of K+1 matrices, there is only one precoding matrix which does not belong to the precoding matrix codebook having a size of K matrices. Assuming that the precoding matrix codebook having a largest size is C, the precoding matrix codebook C has M precoding matrices, i.e. all the precoding matrices in the precoding matrix collection.

Assuming that the precoding matrices in the precoding matrix collection P is arranged in descending order of the contributions made to the performance parameter of the system, then in the precoding matrix codebook group, a precoding matrix codebook having 1 precoding matrix is formed of the first precoding matrix of the precoding matrix codebook C; a precoding matrix codebook having 2 precoding matrices is formed of the first two precoding matrices of the precoding matrix codebook C; and a precoding matrix codebook having k precoding matrices is formed of the first K matrices of the precoding matrix codebook C. When the precoding matrices in the precoding matrix collection P are arranged in ascending order of the contributions made to the performance parameter of the system, the situation is similar to the above, and will not be described in detail herein.

Matrix Adding Mode

According to another embodiment of the present invention, the precoding matrices in a precoding matrix collection is ordered according to the contribution made by each of the precoding matrices to the performance parameter of the system, by the following way: performing a first-level precoding matrix ordering sub-process on the performance parameter matrix TP to determine a precoding matrix which makes a first largest contribution to the performance parameter of the communication system; performing a second-level to a $M^{th}$-level precoding matrix ordering sub-process sequentially to determine M−1 precoding matrices which make a second largest to a $M^{th}$ largest contribution to the performance parameter of the communication system respectively; and ordering the precoding matrices in the precoding matrix collection according to the contribution made by each of the precoding matrices to the performance parameter of the communication system to obtain the ordered precoding matrix collection.

It is now to describe the performing process of a precoding matrix ordering sub-process according to another embodiment of the present invention.

Also taking the performance parameter matrix TP as a first-level performance parameter matrix $TP_1$, the first-level precoding matrix ordering sub-process includes steps of:

(1) taking the $i^{th}$ row of the first-level performance parameter matrix $TP_1$ to form a 1×N performance parameter matrix $TP_{1i}$, wherein i is an integer and 1≤i≤M.

(2) adding the maximum value of each of the columns of the performance parameter matrix $TP_{1i}$, i.e. performing a performance parameter value acquiring operation on the performance parameter matrix $TP_{1i}$, to obtain a value as a performance parameter value of the performance parameter matrix $TP_{1i}$;

(3) repeatedly performing steps (1) and (2) for M times to obtain M performance parameter values of the performance parameter matrix $TP_{1i}$, wherein a different row of the performance parameter matrix $TP_1$ is selected each time;

(4) assuming that a selected row corresponding to the largest one of the M performance parameter values is the $x^{th}$ row of the first-level performance parameter matrix $TP_1$ (represented as a performance parameter matrix $TP^1$), wherein 1≤x≤M, then determining the precoding matrix in the precoding matrix collection associated with the $x^{th}$ row as a precoding matrix making a first largest contribution to the performance parameter of the system; the precoding matrix forming the precoding matrix codebook having one element; and (5) deleting the $x^{th}$ row from the first-level performance parameter matrix $TP_1$ to obtain a (M−1)×N performance parameter matrix as a second-level performance parameter matrix $TP_2$.

Then, a second-level precoding matrix ordering sub-process is performed on the second-level performance parameter matrix $TP_2$. The second-level precoding matrix ordering sub-process includes steps of:

(1) combining the $i^{th}$ row of the second-level performance parameter matrix $TP_2$ and the row (i.e. the performance parameter matrix $TP^1$) of the performance parameter matrix TP associated with the precoding matrix which makes a first largest contribution to the performance parameter of the system, so as to form a 2×N performance parameter matrix $TP_{2i}$, wherein i is an integer and 1≤i≤M−1;

(2) adding the maximum value of each of the columns of the performance parameter matrix $TP_{2i}$, i.e. performing an performance parameter value acquiring operation on the performance parameter matrix $TP_{2i}$ to obtain a value as a performance parameter value of the performance parameter matrix $TP_{2i}$;

(3) repeatedly performing steps (1) and (2) for M−1 times to obtain M−1 performance parameter values of the performance parameter matrix $TP_{2i}$, wherein a different row of the performance parameter matrix $TP_2$ is selected each time;

(4) assuming that a selected row corresponding to the largest one of the M performance parameter values is the $x^{th}$ row of the second-level performance parameter matrix $TP_2$, wherein 1≤x≤M, then determining the precoding matrix in the precoding matrix collection associated with the $x^{th}$ row as a precoding matrix making a second largest contribution to the performance parameter of the system; and (5) deleting the $x^{th}$ row from the second-level performance parameter matrix $TP_2$ to obtain a (M−2)×N performance parameter matrix as a third-level performance parameter matrix $TP_3$.

In the same way, a third-level precoding matrix ordering sub-process to an $M^{th}$-level precoding matrix ordering sub-process are performed respectively to determine precoding matrices which make a third largest to a $M^{th}$ largest contribution to the performance parameter of the system.

In the $k^{th}$-level (1≤K≤M) precoding matrix ordering sub-process, in the step (1), the $i^{th}$ row of the performance parameter matrix is combined with the K−1 rows deleted before the $k^{th}$-level sub-process to form a K×N performance parameter matrix $TP_{ki}$, wherein i is an integer and 1≤i≤M+1−K. When k=1, it is the first-level sub-process and there is no deleted row, therefore, in the step (1), the $i^{th}$ row of the first-level performance parameter matrix $TP_1$ is combined with 0 row to form a 1×N performance parameter matrix.

Then, the M precoding matrices of the precoding matrix collection P can be ordered according to the contributions made to the performance parameter of the system, so as to obtain an ordered precoding matrix set as the precoding matrix codebook group. In the precoding matrix codebook group formed in this way, there are M precoding matrix codebooks in all. The numbers of elements of the codebooks are respectively 1, 2, 3, ..., M−1, M. In addition, the obtained precoding matrix codebook group has a nesting feature.

Figure 4:
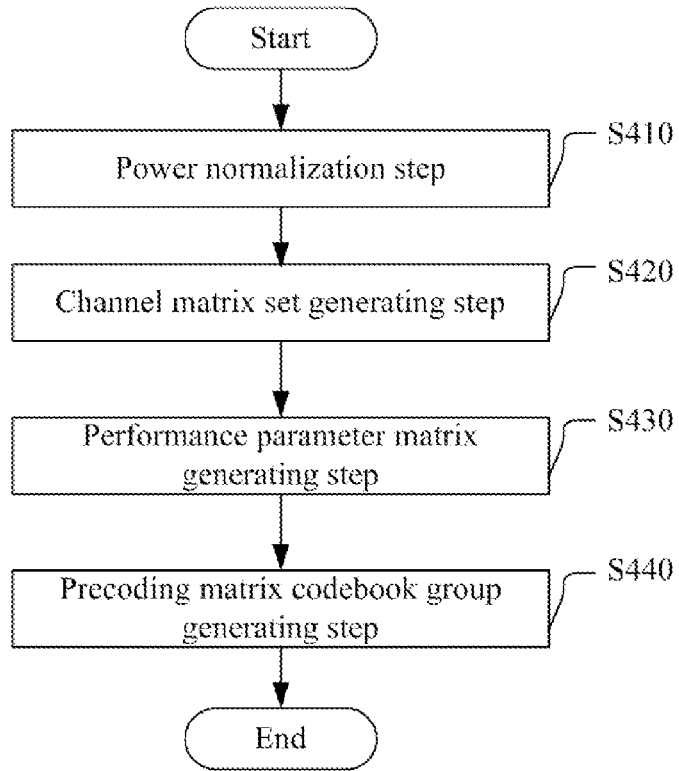
FIG. 4 shows a flowchart of a method for generating a precoding matrix codebook group according to another embodiment of the present invention.
Figure 5:
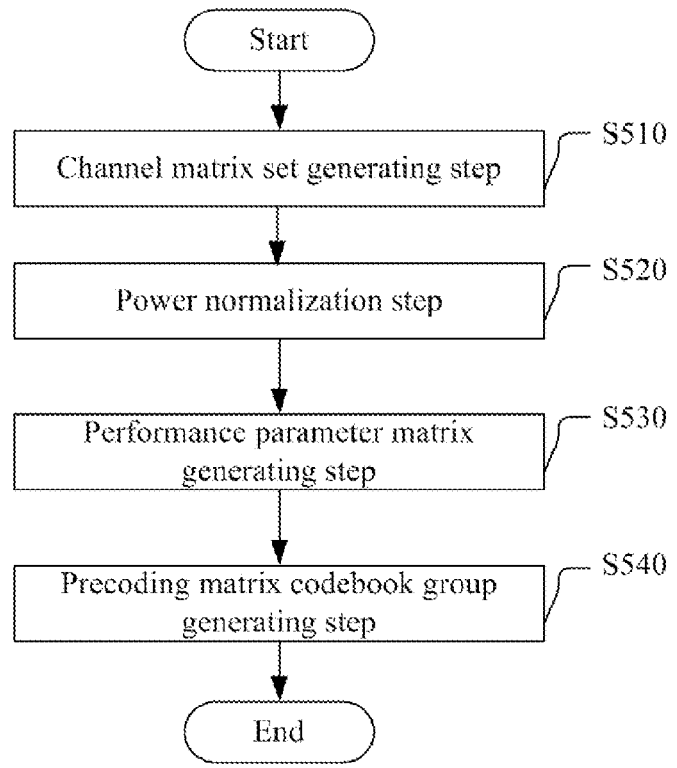
FIG. 5 shows a flowchart of a method for generating a precoding matrix codebook group according to another embodiment of the present invention.

FIG. 4 and FIG. 5 respectively show flowcharts of methods for generating a precoding matrix codebook group according to other embodiments of the present invention. These embodiments are substantially the same as the embodiment shown in FIG. 1, and the difference from the embodiment shown in FIG. 1 is that the methods for generating a precoding matrix codebook group in these embodiments further include a power normalization step before the performance parameter matrix generating step. The power normalization step can be arranged before the channel matrix set generating step, as shown in FIG. 4, and can also be arranged after the channel matrix set generating step and before the performance parameter matrix generating step, as shown in FIG. 5. In the power normalization step according to these embodiments, each of the precoding matrices in the precoding matrix collection can be power normalized with a power normalization matrix that is a diagonal matrix in which the elements at a principal diagonal are not completely the same. Alternatively, each of the precoding matrices in the precoding matrix collection can be power normalized with a power normalization matrix that is a diagonal matrix in which the elements at a principal diagonal are the same.

Application Method of Precoding Matrix Codebook Group

The application of the precoding matrix codebook group generated according to the methods of the embodiments of the present invention is described hereinafter.

As a communication characteristic, in the wireless communication system, a user at a lower SNR region has a higher probability to select a precoding matrix with a lower rank value, and a user at a higher SNR region has a higher probability to select a precoding matrix with a higher rank value.

Consequently, in the wireless communication system, the user at a lower SNR region needs a larger size of precoding matrix codebook for a lower rank value and a smaller size of precoding matrix codebook for a higher rank value, and the user at a higher SNR region needs a smaller size of precoding matrix codebook for a lower rank value and a larger size of precoding matrix codebook for a higher rank value.

The inventor of the present invention found that, there exists a certain correspondence relationship reflecting the above communication characteristic between the SNR and the number of the precoding matrices to be allocated to respective transmission layers of the communication system, for example, as shown in Table 1. In Table 1, it is assumed that the total number of the precoding matrices under all ranks is 56.

TABLE 1

Distribution of numbers of precoding matrices for different ranks under different SNRs

| | SNR(dB) | | | | | | | | | | |
|---|---|---|---|---|---|---|---|---|---|---|---|
| | −5 | −4 | −3 | −2 | −1 | 0 | 1 | 2 | 3 | 4 | 5 |
| Rank = 1 | 56 | 32 | 32 | 32 | 22 | 11 | 8 | 4 | 0 | 0 | 0 |
| Rank = 2 | 0 | 24 | 24 | 24 | 34 | 45 | 48 | 48 | 48 | 48 | 37 |
| Rank = 3 | 0 | 0 | 0 | 0 | 0 | 0 | 0 | 4 | 8 | 8 | 19 |
| Rank = 4 | 0 | 0 | 0 | 0 | 0 | 0 | 0 | 0 | 0 | 0 | 0 |

| | SNR(dB) | | | | | | | | | | |
|---|---|---|---|---|---|---|---|---|---|---|---|
| | 6 | 7 | 8 | 9 | 10 | 11 | 12 | 13 | 14 | 15 | 16 |
| Rank = 1 | 0 | 0 | 0 | 0 | 0 | 0 | 0 | 0 | 0 | 0 | 0 |
| Rank = 2 | 27 | 24 | 24 | 21 | 16 | 12 | 8 | 6 | 4 | 1 | 0 |
| Rank = 3 | 29 | 32 | 32 | 35 | 40 | 43 | 47 | 49 | 51 | 54 | 55 |
| Rank = 4 | 0 | 0 | 0 | 0 | 0 | 1 | 1 | 1 | 1 | 1 | 1 |

As seen from Table 1, under different SNRs, the distribution of the number of the precoding matrices for different Rank values is completely different. Due to the above communication characteristic, for example, all precoding matrices are distributed at Rank=1 when the SNR is very low. With the increasing of the SNR, some precoding matrices begin to be distributed at Rank=2 and Rank=3, and less precoding matrices are distributed at Rank=1. When the SNR is 3 dB, all precoding matrices are distributed at Rank=2 and Rank=3, and there is no precoding matrix distributed at Rank=1 and Rank=4. With the further increasing of the SNR, the precoding matrices distributed at Rank=2 become less and less, and the precoding matrices distributed at Rank=3 become more and more. Since the time when the SNR is 11 dB, a precoding matrix (in the prior art, it is, an identity matrix) occurs at Rank=4. With the further increasing of the SNR, the precoding matrices at Rank=2 become less and less, and the number of the precoding matrices at Rank=2 become zero when the SNR is 16 dB. At the same time, all precoding matrices are distributed at Rank=3 and Rank=4. Since there is only one precoding matrix when Rank=1, the distribution of [0, 0, 55, 1] will not change as the further increasing of the SNR.

Through the above analysis, it can be found that, in an actual system, the distribution of the precoding matrices at different ranks changes as the SNR changes. However, in the prior art, a fixed distribution scheme, such as a distribution of [16, 16, 20, 1], is usually used without considering the SNR. For example, when Rank=3, a base station notifies a mobile station which one in 20 matrices is to be used by the mobile station. This is not an optimal allocation apparently.

In wireless communication systems, the nesting feature of the precoding matrix codebook group generated by the method for generating a precoding matrix codebook group according to the embodiments of the present invention can be utilized to solve the above problems. For example, an uplink transmitter, i.e. a mobile station, only retains the precoding matrix codebook having a maximum size for each Rank value. The storage space is greatly saved due to the nesting feature of the precoding matrix codebook according to the present invention.

Here, it is assumed that both the mobile station and the base station store the precoding matrix codebook groups for different transmission layers which are generated using the method according to the embodiments of the present invention. All precoding matrices in each of the precoding matrix codebook group are ordered according to the contribution made by each of the precoding matrices of the precoding matrix collection having a size of M matrices to the performance parameter of the communication system, wherein M is a positive integer; and in the precoding matrix codebook group, the precoding matrix making a first largest contribution to the performance parameter of the communication system forms a precoding matrix codebook having a size of 1 matrix, and the first K precoding matrices making a first largest to a $K^{th}$ largest contribution to the performance parameter of the communication system respectively form a precoding matrix codebook having a size of K matrices, wherein K is an integer and $1<K \leq M$.

Furthermore, for facilitating illustration, it is assumed that the precoding matrices of the precoding matrix codebook groups stored in the base station and the mobile station are arranged in descending order of the contribution made by each of the precoding matrices to the performance parameter (such as throughput or mutual information) of the system. That is, the first matrix in the precoding matrix codebook group makes the largest contribution to the performance parameter of the system, and the last matrix in the precoding matrix codebook group makes the smallest contribution to the performance parameter of the system.

Figure 6:
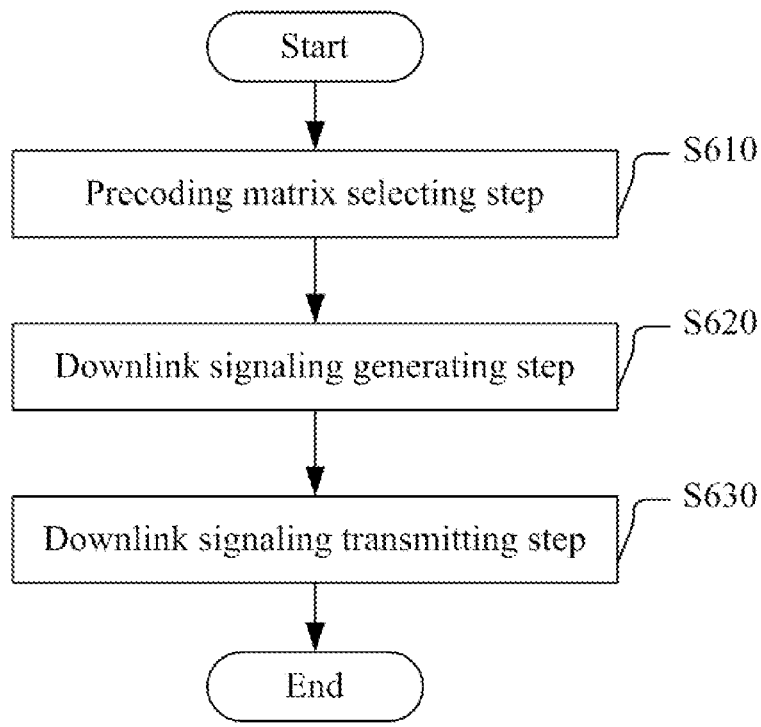
FIG. 6 shows a flowchart of a method for specifying a precoding matrix codebook according to an embodiment of the present invention.

FIG. 6 shows a flowchart of a method for specifying a precoding matrix according to an embodiment of the present invention. The method can be used in a multi-antenna communication system which includes at least one base station and at least one mobile station.

As shown in FIG. 6, in step S610, a precoding matrix selecting step is performed. The base station selects, from a precoding matrix codebook group stored on the base station, a precoding matrix to be specified for communication between the base station and the mobile station, according to information of a signal received from the mobile station.

In step S620, a downlink signaling generating step, is performed. The base station generates, based on the selected precoding matrix, downlink signaling which contains information indicating the selected precoding matrix.

Next, in step S630, a downlink signaling sending step is performed: transmitting the generated downlink signaling to the mobile station.

Figure 7:
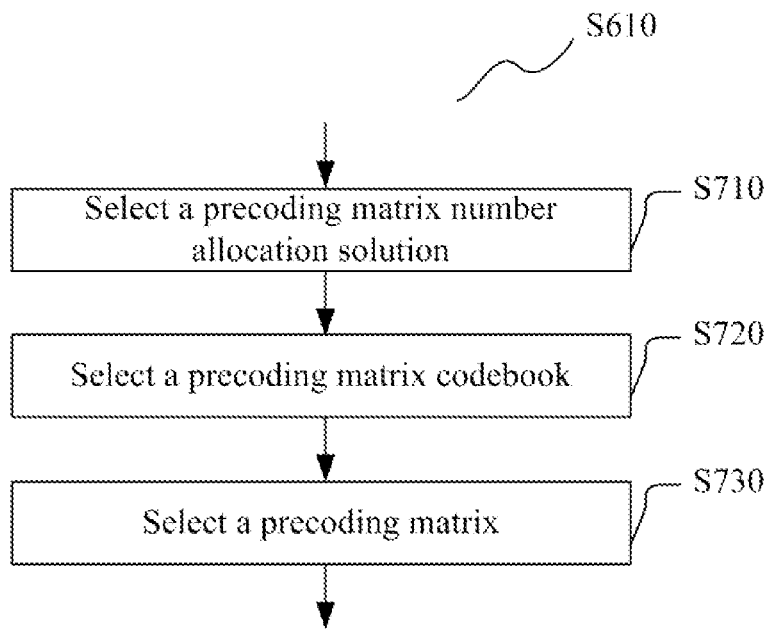
FIG. 7 shows a flowchart of a precoding matrix selecting step according to an embodiment of the present invention.

FIG. 7 shows a flowchart of precoding matrix selecting step according to an embodiment of the present invention.

As shown in FIG. 7, in step S710, the base station selects, from a precoding matrix number allocation table stored on the base station, a precoding matrix number allocation solution corresponding to the SNR, according to the SNR of the received signal. The precoding matrix number allocation table contains a correspondence relationship between SNRs and the number of the precoding matrices to be allocated to each transmission layer of the system.

In step S720, the base station selects, from the respective precoding matrix codebook group corresponding to each transmission layer, a precoding matrix codebook having a size as the number of the precoding matrices to be allocated to the transmission layer, according to the selected precoding matrix number allocation solution.

Next, in step S730, the base station selects, from a precoding matrix set formed of the precoding matrices in the selected precoding matrix codebook, a precoding matrix which allows the performance parameter of the current channel used for the communication between the mobile station and the base station to be the maximum. As an example, the performance parameter may be throughput. Any existing methods can be used by those skilled in the art to select the precoding matrix which allows the performance parameter of the current channel used for the communication between the mobile station and the base station to be the maximum, which will not be described in detail herein.

Furthermore, according to an embodiment of the present invention, the downlink signaling generating step further includes: carrying information indicating the selected precoding matrix number allocation solution and information indicating the selected precoding matrix onto the downlink signaling.

Figure 8:
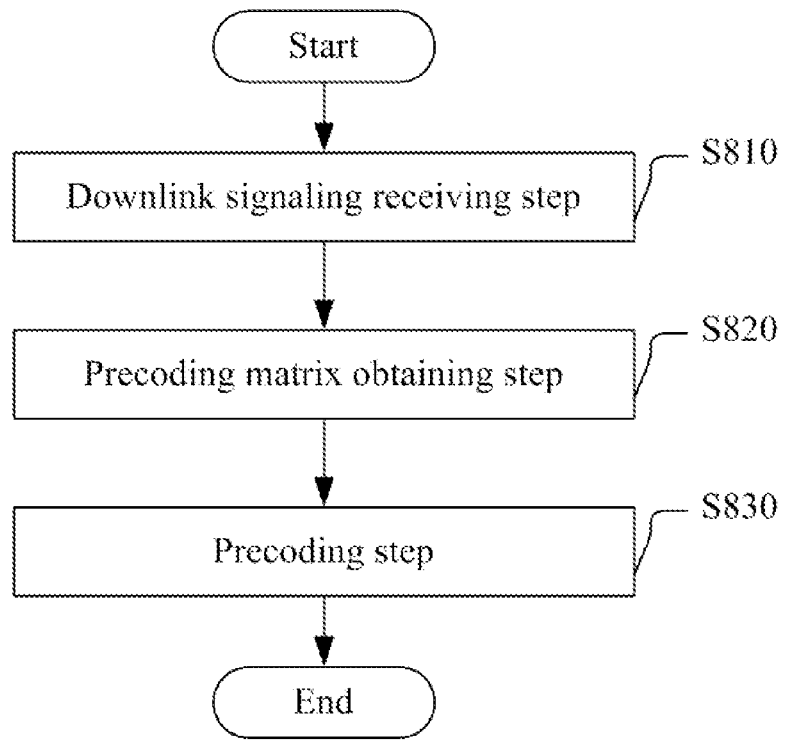
FIG. 8 shows a flowchart of a data transmission method according to an embodiment of the present invention.

FIG. 8 shows a flowchart of a data transmission method according to an embodiment of the present invention. The method can be used in a multi-antenna communication system which includes at least one base station and at least one mobile station.

As shown in FIG. 8, in step S810, a downlink signaling receiving step is performed. The mobile station receives downlink signaling from the base station. The downlink signaling contains information indicating a precoding matrix specified by the base station and to be used for the communication between the base station and the mobile station.

In step S820, a precoding matrix obtaining step is performed. The mobile station obtains, from a precoding matrix codebook group stored on the mobile station, the precoding matrix according to the information indicating the precoding matrix.

In step S830, a precoding step is performed. The mobile station precodes data to be transmitted to the base station with the obtained precoding matrix.

In this way, the data can be transmitted from the mobile station to the base station.

Furthermore, the downlink signaling received by the mobile station may also contain information indicating a precoding matrix number allocation solution presenting the number of precoding matrices to be allocated to each transmission layer of the communication system.

Figure 9:
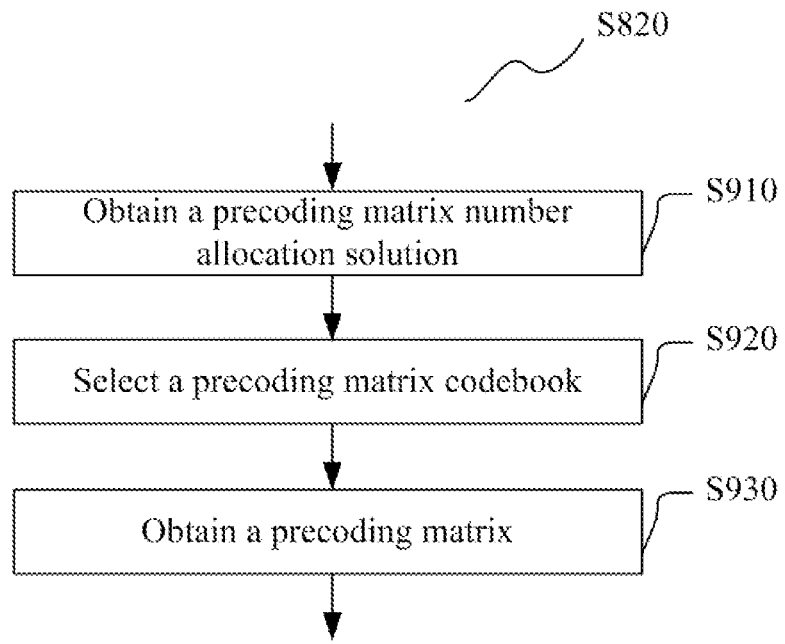
FIG. 9 shows a flowchart of a precoding matrix obtaining step according to an embodiment of the present invention.

FIG. 9 shows a flowchart of precoding matrix obtaining step according to an embodiment of the present invention.

As shown in FIG. 9, in step S910, the mobile station obtains, from a precoding matrix number allocation table stored on the mobile station, the precoding matrix number allocation solution according to the information indicating the precoding matrix number allocation solution. The precoding matrix number allocation table contains a correspondence relationship between SNRs and the number of precoding matrices to be allocated to each transmission layer of the communication system.

In step S920, the mobile station selects, from the respective precoding matrix codebook group corresponding to each transmission layer, a precoding matrix codebook having a size as the number of the precoding matrices to be allocated to the transmission layer, according to the obtained precoding matrix number allocation solution.

In step S930, the mobile station obtains, from a precoding matrix set formed of the precoding matrices in the selected precoding matrix codebook, the precoding matrix according to the information indicating the precoding matrix specified by the base station.

The method for specifying a precoding matrix and the data transmission method according to embodiments of the present invention are illustrated hereinafter in conjunction with specific examples.

Firstly, as application environment of the method for specifying a precoding matrix according to an embodiment of the present invention, in addition to the precoding matrix collection generated according to the method of the embodiments of the present invention, a precoding matrix number allocation table is also stored on the base station and the mobile station. The following Table 2 and Table 3 are two examples of the precoding matrix number allocation table. In Table 2 and Table 3, each column presents an allocation solution of the number of the precoding matrices for different ranks under a different SNR. The Index in the table is used for indicating the allocation solution in each column. When performing a table query, an allocation solution which matches the SNR or is most approximate to the SNR is selected from Table 2 or Table 3.

TABLE 2

Precoding matrix number allocation table with 4-bit index

| | Index | | | | | | | |
|---|---|---|---|---|---|---|---|---|
| | 0000 | 0001 | 0010 | 0011 | 0100 | 0101 | 0110 | 0111 |
| | | | | SNR(dB) | | | | |
| | −5 | −4 | −1 | 0 | 1 | 2 | 3 | 5 |
| Rank = 1 | 56 | 32 | 22 | 11 | 8 | 4 | 0 | 0 |
| Rank = 2 | 0 | 24 | 34 | 45 | 48 | 48 | 48 | 37 |
| Rank = 3 | 0 | 0 | 0 | 0 | 0 | 4 | 8 | 19 |
| Rank = 4 | 0 | 0 | 0 | 0 | 0 | 0 | 0 | 0 |
| | Index | | | | | | | |
| | 1000 | 1001 | 1010 | 1011 | 1100 | 1101 | 1110 | 1111 |
| | | | | SNR(dB) | | | | |
| | 6 | 7 | 9 | 10 | 11 | 12 | 13 | 14 |
| Rank = 1 | 0 | 0 | 0 | 0 | 0 | 0 | 0 | 0 |
| Rank = 2 | 27 | 24 | 21 | 16 | 12 | 8 | 6 | 4 |
| Rank = 3 | 29 | 32 | 35 | 40 | 43 | 47 | 49 | 51 |
| Rank = 4 | 0 | 0 | 0 | 0 | 1 | 1 | 1 | 1 |

TABLE 3

Precoding matrix number allocation table with 3-bit index

| | Index | | | | | | | |
|---|---|---|---|---|---|---|---|---|
| | 000 | 001 | 010 | 011 | 100 | 101 | 110 | 111 |
| | | | | SNR(dB) | | | | |
| | −5 | −1 | 1 | 3 | 6 | 9 | 11 | 13 |
| Rank = 1 | 56 | 22 | 8 | 0 | 0 | 0 | 0 | 0 |
| Rank = 2 | 0 | 34 | 48 | 48 | 27 | 21 | 12 | 6 |
| Rank = 3 | 0 | 0 | 0 | 8 | 29 | 35 | 43 | 49 |
| Rank = 4 | 0 | 0 | 0 | 0 | 0 | 0 | 1 | 1 |

The method for specifying a precoding matrix by a the base station and the data transmission method implemented by a mobile station according to the embodiments of the present invention in a 4 transmitting antenna system are described hereinafter by taking Table 2 as example.

As shown in Table 2, the maximum value of the number of the precoding matrices is 56 in the case of Rank=1; the maximum value of the number of the precoding matrices is 48 in the case of Rank=2; the maximum value of the number of the precoding matrices is 51 in the case of Rank=3; and the precoding matrix is an identity matrix in the case of Rank=4.

Therefore, a precoding matrix codebook group for Rank=1 which includes no less than 56 precoding matrices, a precoding matrix codebook group for Rank=2 which includes no less than 48 precoding matrices, a precoding matrix codebook group for Rank=3 which includes no less than 51 precoding matrices and an identity matrix for Rank=4 are stored on the base station.

When the mobile station initiates an uplink data transmission, the base station specifies, according to information of a signal received from the mobile station, a precoding matrix for the mobile station which is used for the communication between the base station and the mobile station as follows:

(1) The base station selects a column, such as a column in which the index 0101 lies, in Table 2, according to the SNR of the signal from the mobile station received by the base station. In the allocation solution in this column, there are 4 precoding matrices at Rank=1, 48 precoding matrices at Rank=2, 4 precoding matrices at Rank=3, and no precoding matrix at Rank=4.

(2) The base station selects the first 4 precoding matrices from the precoding matrix codebook group for Rank=1 to form a precoding matrix codebook for Rank=1, selects the first 48 precoding matrices from the precoding matrix codebook group for Rank=2 to form a precoding matrix codebook for Rank=2, and selects the first 4 precoding matrices from the precoding matrix codebook group for Rank=3 to form a precoding matrix codebook for Rank=3. The codebook for Rank=4 is a null set.

(3) In a precoding matrix codebook set formed by the precoding matrix codebooks respectively for Rank=1, 2, 3 and 4, there are 56 precoding matrices in all. The base station selects, from the 56 precoding matrices, a precoding matrix which allows the performance parameter of the current channel to be the maximum. It is assumed that the precoding matrix is the $9^{th}$ precoding matrix in the above 56 precoding matrices, i.e. the serial number of the precoding matrix is 1001.

(4) The base station transmits, by means of downlink signaling, information indicating the precoding matrix number allocation solution, i.e. Index value 0101 in Table 2, and information indicating the precoding matrix, i.e. the serial number 1001 of the precoding matrix, to the mobile station.

The mobile station receives the downlink signaling from the base station and obtains the precoding matrix specified by the base station from the downlink signaling to carry out the data transmission:

(1) The mobile station obtains, from the downlink signaling, the index value 0101 in the precoding matrix number allocation table and the serial number 1001 of the precoding matrix.

(2) The mobile station selects, from a precoding matrix number allocation table stored on the mobile station, a precoding matrix allocation solution with an index value of 0101. In the allocation solution, there are 4 precoding matrices at Rank=1, 48 precoding matrices at Rank=2, 4 precoding matrices at Rank=3 and 0 precoding matrices at Rank=4.

(3) The mobile station selects the first 4 precoding matrices from the precoding matrix codebook group for Rank=1 to form a precoding matrix codebook for Rank=1, selects the first 48 precoding matrices from the precoding matrix codebook group for Rank=2 to form a precoding matrix codebook for Rank=2, and selects the first 4 precoding matrices from the precoding matrix codebook group for Rank=3 to form a precoding matrix codebook for Rank=3. The codebook for Rank=4 is a null set.

(4) In a precoding matrix codebook set formed by the precoding matrix codebooks respectively for Rank=1, 2, 3 and 4, there are 56 precoding matrices in all. The mobile station selects, from the 56 precoding matrices, a precoding matrix with serial number 1001, i.e. the $9^{th}$ precoding matrix, as the precoding matrix to be used currently.

(5) The mobile station precodes the data to be transmitted with the selected precoding matrix.

In this way, the mobile station can perform data transmission with the base station by using the specified precoding matrix.

In addition, it should be noted that, according to actual applications, the process of determining the precoding matrix codebook set between the base station and the mobile station may be a slow process, and it is not necessary to update the precoding matrix codebook set in each data transmission.

Apparatus for Generating Precoding Matrix Codebook Group

An apparatus for generating a precoding matrix codebook group according to embodiments of the present invention is described hereafter with reference to the drawing.

Figure 10:
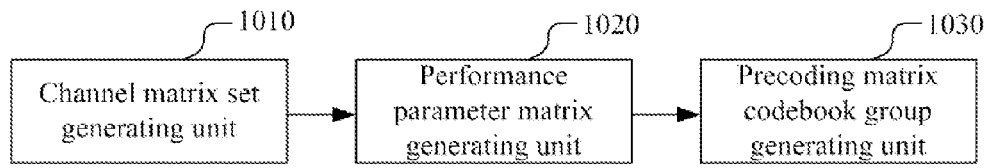
FIG. 10 shows a schematic block diagram of an apparatus for generating a precoding matrix codebook group according to an embodiment of the present invention.

FIG. 10 show a schematic block diagram of an apparatus for generating a precoding matrix codebook group for a multi-antenna communication system according to an embodiment of the present invention. As shown in FIG. 10, an apparatus 1000 for generating a precoding matrix codebook group for a multi-antenna communication system, which is abbreviated as an apparatus for generating a precoding matrix codebook group, includes a channel matrix set generating unit 1010, a performance parameter matrix generating unit 1020 and a precoding matrix codebook group generating unit.

According to an embodiment of the present invention, the channel matrix set generating unit 1010 is configured to generate a channel matrix set including N channel matrices, wherein N is an integer greater than 1, and each of the channel matrices corresponds to a channel instance.

According to the embodiment, the performance parameter generating unit 1020 is configured to generate a M×N performance parameter matrix TP based on the channel matrix set and a precoding matrix collection including M precoding matrices, wherein M is an positive integer, each row of the performance parameter matrix TP represents the values of the performance parameter associated with the same precoding matrix, and each column of the performance parameter matrix TP represents the values of the performance parameter associated with the same channel matrix.

According to the embodiment, the precoding matrix codebook group generating unit 1030 is configured to order, based on the performance parameter matrix TP, the precoding matrices of the precoding matrix collection according to the contribution made by each of the precoding matrices to the performance parameter of the communication system, to obtain an ordered precoding matrix collection as the precoding matrix codebook group.

In the precoding matrix codebook group generated by using the precoding matrix codebook generating apparatus 1000 according to the above embodiment of the present invention, an precoding matrix in the ordered precoding matrix collection which makes the first largest contribution to the performance parameter of the communication system forms a precoding matrix codebook having a size of 1 matrix, and the first K precoding matrices respectively making a first largest to a $K^{th}$ largest contribution to the performance parameter of the communication system form a precoding matrix codebook having a size of K matrices, wherein K is an integer and $1 < K \leq M$.

Figure 11:
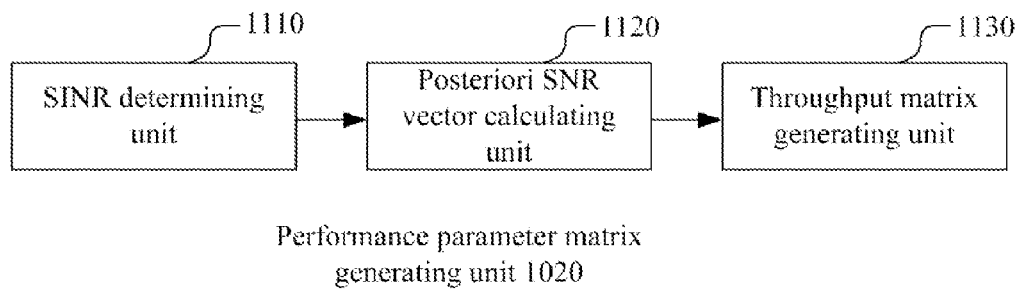
FIG. 11 shows a schematic block diagram of a performance parameter matrix generating unit according to an embodiment of the present invention.

FIG. 11 shows a schematic block diagram of a performance parameter matrix generating unit according to an embodiment of the present invention. As shown in FIG. 11, the performance parameter matrix generating unit 1020 includes a SINR determining unit 1110, a posteriori SNR vector calculating unit 1120 and a throughput matrix generating unit 1130.

According to an embodiment of the present invention, the SINR determining unit 1110 is configured to determine the SINR of the communication system.

According to the embodiment, the posteriori SNR vector calculating unit 1120 is configured to calculate a posteriori SNR vector of the communication system corresponding to each precoding matrix in the precoding matrix collection based on the SINR and with respect to the channel instance corresponding to each channel matrix in the channel matrix set, to obtain M×N posteriori SNR vectors.

According to the embodiment, the throughput matrix generating unit 1130 is configured to transform the posteriori SNR vectors into values of the throughput of the communication system, and arrange all the values of the throughput into a M×N throughput matrix TP. In the throughput matrix TP, each row represents the values of the throughput of the communication system associated with the same precoding matrix, each column represents the values of the throughput associated with the same channel matrix, and each element represents a value of the throughput reached by the communication system when the precoding matrix associated with the row in which the element lies is used under the channel instance corresponding to the channel matrix associated with the column in which the element lies.

Figure 12:
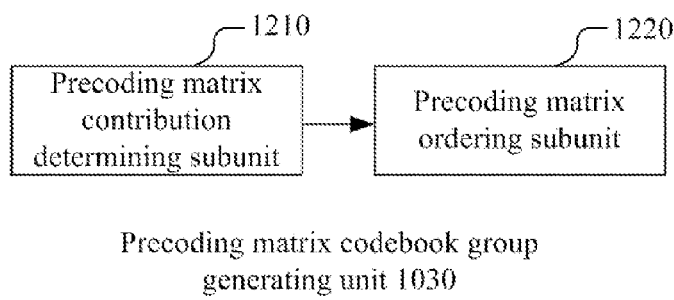
FIG. 12 shows a schematic block diagram of a precoding matrix codebook group generating unit according to an embodiment of the present invention.

FIG. 12 shows a schematic block diagram of a precoding matrix codebook group generating unit according to an embodiment of the present invention. As shown in FIG. 12, the precoding matrix codebook group generating unit 1030 includes a precoding matrix contribution determining subunit 1210 and a precoding matrix arranging subunit 1220.

According to an embodiment of the present invention, the precoding matrix contribution determining subunit 1210 is configured to perform a first-level precoding matrix ordering sub-process on the performance parameter matrix TP to determine a precoding matrix which makes a first least contribution to the performance parameter of the communication system, and perform a second-level to a $M^{th}$-level precoding matrix ordering sub-process sequentially to determine M−1 precoding matrices which make a second least to a $M^{th}$ least contribution to the performance parameter of the communication system respectively.

According to the embodiment, the precoding matrix arranging subunit 1220 is configured to order the precoding matrices according to the contribution made by each of the precoding matrices to the performance parameter of the communication system to obtain the ordered precoding matrix collection.

According to another embodiment of the present invention, the precoding matrix contribution determining subunit 1210 is further configured to take the performance parameter matrix TP as a first-level performance parameter matrix $TP_1$ and perform the $K^{th}$-level precoding matrix ordering sub-process in the following way, wherein K is an integer and $1 < K \leq M$:

A) deleting the $i^{th}$ row of a $K^{th}$-level performance parameter matrix $TP_K$ to obtain a (M−K)×N performance parameter matrix $TP_{Ki}$, wherein i is an integer and $1 \leq i \leq M+1-K$;

B) adding the maximum value of each of the columns of the performance parameter matrix $TP_{Ki}$, to obtain a value as a performance parameter value of the performance parameter matrix $TP_{Ki}$;

C) repeatedly performing steps A) and B) for M+1−K times to obtain M+1−K performance parameter values of the performance parameter matrix $TP_{Ki}$, wherein a different row of the performance parameter matrix $TP_{Ki}$, is deleted each time;

D) determining the precoding matrix associated with a deleted row corresponding to the largest one of the M+1−K performance parameter values, as a precoding matrix making a $K^{th}$ least contribution to the parameter of the communication system; and E) deleting the row corresponding to the largest one of the M+1−K performance parameter values from the $K^{th}$-level performance parameter matrix $TP_K$ to obtain a (M−K)×N performance parameter matrix as a $(K+1)^{th}$-level performance parameter matrix.

According to an embodiment of the present invention, the precoding matrix contribution determining subunit 1210 is configured to perform a first-level precoding matrix ordering sub-process on the performance parameter matrix TP to determine a precoding matrix which makes a first largest contribution to the performance parameter of the communication system, and perform a second-level to a $M^{th}$-level precoding matrix ordering sub-process sequentially to determine M−1 precoding matrices which make a second largest to a $M^{th}$ largest contribution to the performance parameter of the communication system respectively.

According to the embodiment, the precoding matrix arranging subunit 1220 is configured to order the precoding matrices according to the contribution made by each of the precoding matrices to the performance parameter of the communication system to obtain the ordered precoding matrix collection.

According to another embodiment of the present invention, the precoding matrix contribution determining subunit is further configured to take the performance parameter matrix TP as a first-level performance parameter matrix $TP_1$, and perform the $K^{th}$-level precoding matrix ordering sub-process in the following way, wherein K is an integer and $1 < K \leq M$:

A) combining the $i^{th}$ row of the $K^{th}$-level performance parameter matrix $TP_K$ and K−1 rows of performance parameter matrix TP which are associated with the precoding matrices which make a first largest to a $(K-1)^{th}$ largest contribution to the performance parameter of the communication system to form a K×N performance parameter matrix $TP_{Ki}$, wherein i is an integer and $1 \leq i \leq M+1-K$;

B) adding the maximum value in each of the columns of the performance parameter matrix $TP_{Ki}$, to obtain a value as a performance parameter value of the performance parameter matrix $TP_{Ki}$;

C) repeatedly performing steps A) and B) for M+1−K times to obtain M+1−K performance parameter values of the performance parameter matrix $TP_{Ki}$, wherein a different row of the performance parameter matrix $TP_{Ki}$, is selected each time;

D) determining the precoding matrix associated with a selected row corresponding to the largest one of the M+1−K performance parameter values, as a precoding matrix making a $K^{th}$ largest contribution to the performance parameter of the communication system; and E) deleting the row corresponding to the largest one of the M+1−K performance parameter values from the $K^{th}$-level performance parameter matrix $TP_K$ to obtain a (M−K)×N performance parameter matrix as a $(K+1)^{th}$-level performance parameter matrix.

According to an embodiment of the present invention, the apparatus 1000 for generating a precoding matrix codebook group further includes a precoding matrix collection forming unit (not shown). The precoding matrix collection forming unit is configured to:

determine a precoding matrix form as [1, 1, . . . 1; $x_{11}$, $x_{12}$, . . . , $x_{1q}$; $x_{21}$, $x_{22}$, . . . , $x_{2q}$; . . . , . . . , . . . ; $x_{p1}$, $x_{p2}$, . . . , $x_{pq}$], wherein 1≤p≤P and 1≤q≤Q, P represents the number of transmitting antennas of the communication system, and Q represents a rank of the communication system; and form the precoding matrix collection by using at least one of the following precoding matrix satisfying the form: a precoding matrix formed by at least one column of a DFT matrix, a precoding matrix formed by at least one column of a Hadamard matrix, a precoding matrix formed by QPSK constellation points as elements, a precoding matrix formed by 8PSK constellation points as elements, and a precoding matrix formed by 16PSK constellation points as elements.

Figure 13:
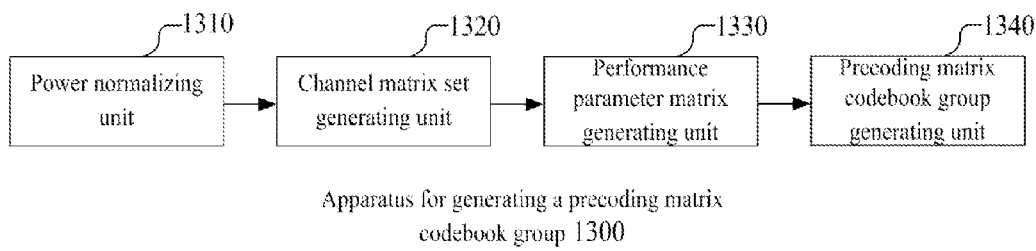
FIG. 13 shows a schematic block diagram of an apparatus for generating a precoding matrix codebook group according to another embodiment of the present invention.
Figure 14:
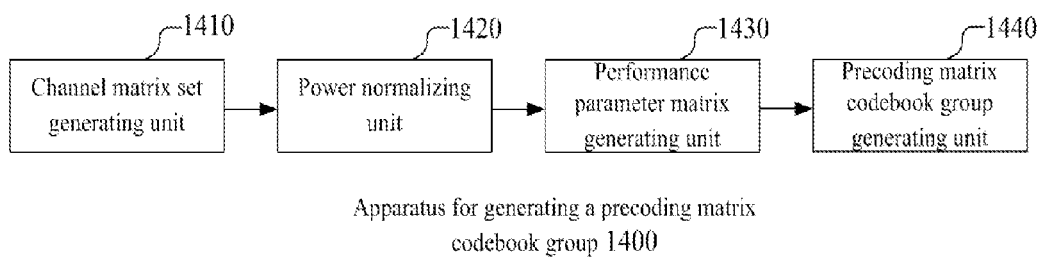
FIG. 14 shows a schematic block diagram of an apparatus for generating a precoding matrix codebook group according to another embodiment of the present invention.

FIG. 13 and FIG. 14 show schematic block diagrams of apparatuses for generating a precoding matrix codebook group according to other embodiments of the present invention. Compared with the apparatus 1000 for generating a precoding matrix codebook group shown in FIG. 10, the apparatuses 1300 and 1400 for generating a precoding matrix codebook group shown in FIG. 13 and FIG. 14 respectively include a power normalizing unit 1310 and a power normalizing unit 1420.

The function of the power normalizing unit 1310 is the same as the function of the power normalizing unit 1420. According to an embodiment of the present invention, the power normalizing units 1310 and 1420 are configured to normalize each of the precoding matrices in the precoding matrix collection with a power normalization matrix that is a diagonal matrix in which the elements at the principal diagonal are not completely the same. According to other embodiments of the present invention, the power normalizing units 1310 and 1420 can be configured to normalize each of the precoding matrices in the precoding matrix collection with a power normalization matrix that is a diagonal matrix in which the elements at the principal diagonal are the same.

The difference between the power normalizing unit 1310 and the power normalizing unit 1420 is that the power normalizing unit 1310 is connected in front of the channel matrix set generating unit 1320, as shown in FIG. 13. That is, the power normalizing unit 1310 normalizes the precoding matrices in the precoding matrix collection before the channel matrix set is generated. While in FIG. 14, the power normalizing unit 1310 is connected behind the channel matrix set generating unit 1320 and in front of the performance parameter matrix generating unit 1430. That is, the power normalizing unit 1310 normalizes the precoding matrices in the precoding matrix collection after the channel matrix set is generated and before the performance parameter matrix is generated.

The functions of other components in the apparatuses 1300 and 1400 for generating a precoding matrix codebook group are the same as the functions of corresponding components in the apparatus 1000 for generating a precoding matrix codebook group, which will not be described in detail herein.

Base Station and Mobile Station

A base station and a mobile station according to embodiments of the present invention are described hereinafter with reference to the drawings. The base station and the mobile station apply a precoding matrix codebook group generated by the method and apparatus according to the present invention.

Figure 15:
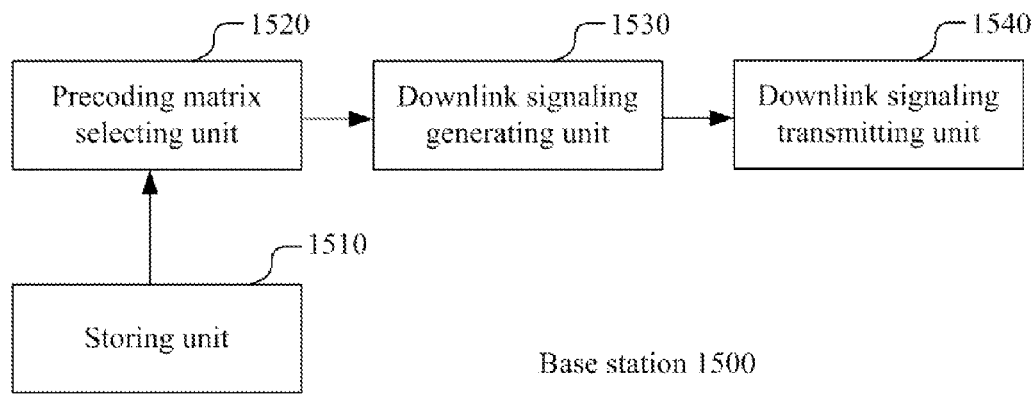
FIG. 15 shows a schematic block diagram of a base station according to an embodiment of the present invention.

FIG. 15 shows a schematic block diagram of a base station according to an embodiment of the present invention. As shown in FIG. 15, the base station 1500 includes a storing unit 1510, a precoding matrix selecting unit 1520, a downlink signaling generating unit 1530 and a downlink signaling transmitting unit 1540. Those skilled in the art should understand that other possible components of the base station 1500 are omitted in FIG. 15 in order to avoid obscuring the spirit and scope of the present invention.

The base station 1500 can be used in a multi-antenna communication system which includes at least one base station and at least one mobile station.

According to an embodiment of the present invention, the storing unit 1510 is configured to store at least one precoding matrix codebook group, wherein each precoding matrix codebook group corresponds to a transmission layer of the communication system. All precoding matrices in each precoding matrix codebook group are ordered according to the contribution made by each of the precoding matrices in a precoding matrix collection having a size of M matrices to a performance parameter of the communication system, M being a positive integer. In the precoding matrix codebook group, the precoding matrix in the ordered precoding matrix collection making a first largest contribution to the performance parameter of the communication system forms a precoding matrix codebook having a size of 1 matrix, and the first K precoding matrices respectively making a first largest to a $K^{th}$ largest contribution to the performance parameter of the communication system form a precoding matrix codebook having a size of K matrices, wherein K is an integer and 1<K≤M.

According to the embodiment, the precoding matrix selecting unit 1520 is configured to select, from the precoding matrix codebook group stored on the storing unit, a precoding matrix to be specified for the communication between the base station and the mobile station, according to information of a signal received from the mobile station.

According to the embodiment, the downlink signaling generating unit 1530 is configured to generate, based on the selected precoding matrix, downlink signaling which contains information indicating the selected precoding matrix.

According to the embodiment, the downlink signaling transmitting unit 1540 is configured to transmit the generated downlink signaling to the mobile station.

Figure 16:
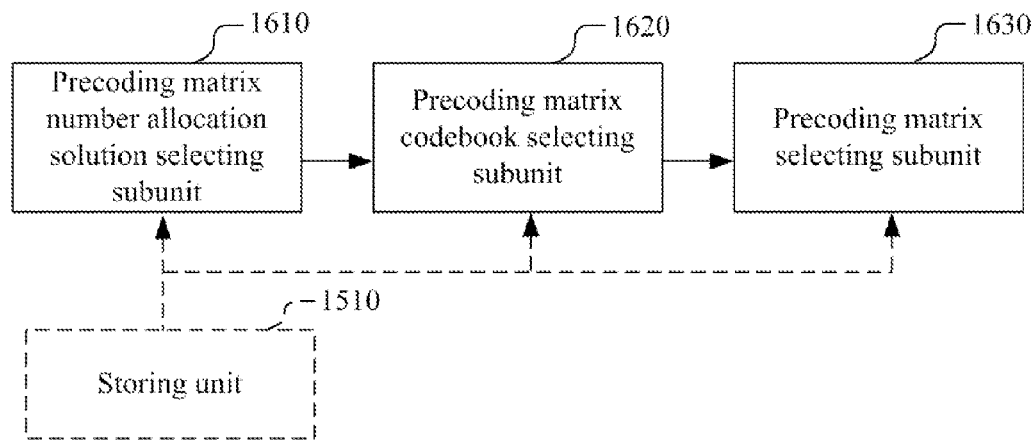
FIG. 16 shows a schematic block diagram of a precoding matrix selecting unit according to an embodiment of the present invention.

FIG. 16 shows a schematic block diagram of a precoding matrix selecting unit according to an embodiment of the present invention. As shown in FIG. 16, the precoding matrix selecting unit 1520 includes a precoding matrix number allocation solution selecting subunit 1610, a precoding matrix codebook selecting subunit 1620 and a precoding matrix selecting subunit 1630. The dashed lines in FIG. 16 shows an example of a connection relationship between each of the components in the precoding matrix selecting unit 1520 and the storing unit 1510. Other connection relationships can be easily conceived by those skilled in the art.

According to an embodiment of the present invention, the storing unit 1510 is further configured to store a precoding matrix number allocation table containing a correspondence relationship between SNRs and the number of precoding matrices to be allocated to each transmission layer of the communication system.

According to the embodiment, the precoding matrix number allocation solution selecting subunit 1610 is configured to select, from the precoding matrix number allocation table stored on the storing unit, a precoding matrix number allocation solution corresponding to SNR of the signal received by the base station according to the SNR;

According to the embodiment, the precoding matrix codebook selecting subunit 1620 is configured to select, from the respective precoding matrix codebook group corresponding to each transmission layer, a precoding matrix codebook having a size as the number of the precoding matrices to be allocated to the transmission layer, according to the selected precoding matrix number allocation solution.

According to the embodiment, the precoding matrix selecting subunit 1630 is configured to select, from a precoding matrix set formed of the precoding matrices in the selected precoding matrix codebook, a precoding matrix which allows the performance parameter of the current channel used for the communication between the mobile station and the base station to be the maximum. As an example, the performance parameter may be throughput.

According to another embodiment of the present invention, the downlink signaling generating unit 1530 is also configured to carry the information indicating the selected precoding matrix number allocation solution and the information indicating the selected precoding matrix onto the downlink signaling.

Figure 17:
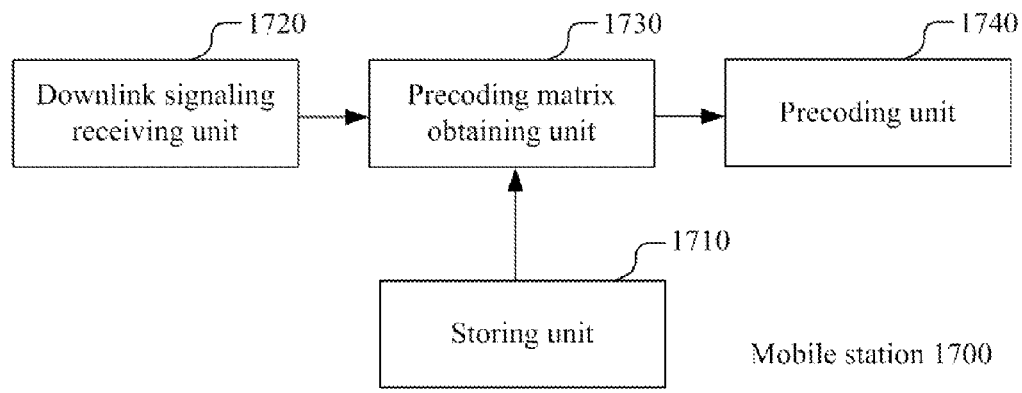
FIG. 17 shows a schematic block diagram of a mobile station according to an embodiment of the present invention.

FIG. 17 shows a schematic block diagram of a mobile station according to an embodiment of the present invention. As shown in FIG. 7, the mobile station 1700 includes a storing unit 1710, a downlink signaling receiving unit 1720, a precoding matrix obtaining unit 1730 and a precoding unit 1740. Those skilled in the art should understand that, other possible components of the mobile station 1700 are omitted in FIG. 17 in order to avoid obscuring the spirit and scope of the present invention.

The mobile station 1700 can be used in a multi-antenna communication system which includes at least one mobile station and at least one base station.

According to an embodiment of the present invention, the storing unit 1710 is configured to store at least one precoding matrix codebook group. Each precoding matrix codebook group corresponds to a transmission layer of the communication system. All precoding matrices in each precoding matrix codebook group are ordered according to the contribution made by each of the precoding matrices in a precoding matrix collection having a size of M matrices to a performance parameter of the communication system, M being a positive integer. In the precoding matrix codebook group, the precoding matrix in the ordered precoding matrix collection making a first largest contribution to the performance parameter of the communication system forms a precoding matrix codebook having a size of 1 matrix, and the first K precoding matrices respectively making a first largest to a $K^{th}$ largest contribution to the performance parameter of the communication system form a precoding matrix codebook having a size of K matrices, wherein K is an integer and $1 < K \leq M$.

According to the embodiment of the present invention, the downlink signaling receiving unit 1720 is configured to receive downlink signaling from the base station. The downlink signaling contains information indicating a precoding matrix specified by the base station and to be used for the communication between the base station and the mobile station.

According to the embodiment of the present invention, the precoding matrix obtaining unit 1730 is configured to obtain the precoding matrix from the precoding matrix codebook group stored on the storing unit according to information indicating the precoding matrix.

According to the embodiment of the present invention, the precoding unit 1740 is configured to precode data to be transmitted to the base station with the obtained precoding matrix.

Figure 18:
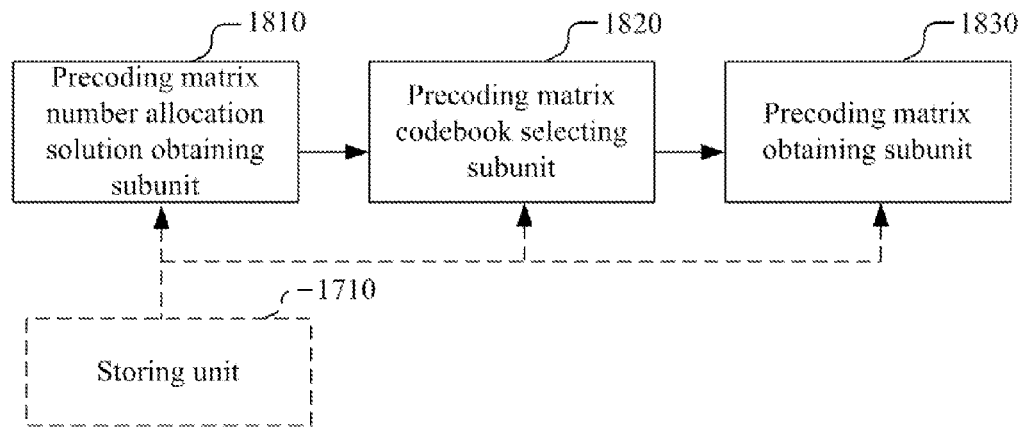
FIG. 18 shows a schematic block diagram of a precoding matrix obtaining unit according to an embodiment of the present invention.

FIG. 18 shows a schematic block diagram of a precoding matrix obtaining unit according to an embodiment of the present invention. As shown in FIG. 18, the precoding matrix obtaining unit 1730 includes a precoding matrix number allocation solution obtaining subunit 1810, a precoding matrix book selecting subunit 1820 and a precoding matrix obtaining subunit 1830. The dashed lines in FIG. 18 show an example of a connection relationship between each of the components in the precoding matrix obtaining unit 1730 and the storing unit 1710. Other possible connection relationships can be easily conceived by those skilled in the art.

According to an embodiment of the present invention, the downlink signaling also contains information indicating a precoding matrix number allocation solution presenting the number of precoding matrices to be allocated to each transmission layer of the communication system.

According to the embodiment of the present invention, the storing unit 1710 is further configured to store a precoding matrix number allocation table. The precoding matrix number allocation table contains a correspondence relationship between SNRs and the number of precoding matrices to be allocated to each transmission layer of the communication system.

According to the embodiment of the present invention, the precoding matrix number allocation solution obtaining subunit 1810 is configured to obtain, from the precoding matrix number allocation table stored on the storing unit, the precoding matrix number allocation solution according to the information indicating the precoding matrix number allocation solution.

According to the embodiment of the present invention, the precoding matrix codebook selecting subunit 1820 is configured to select, from the respective precoding matrix codebook group corresponding to each transmission layer, a precoding matrix codebook having a size as the number of the precoding matrices to be allocated to the transmission layer, according to the precoding matrix number allocation solution obtained by the precoding matrix number allocation solution obtaining subunit.

According to the embodiment of the present invention, the precoding matrix obtaining subunit 1830 is configured to obtain the precoding matrix from a precoding matrix set formed of the precoding matrices in the precoding matrix codebook selected by the precoding matrix codebook selecting subunit, according to the information indicating the precoding matrix specified by the base station.

For the further details of operations on each unit in the above respective apparatuses, one can refer to the embodiments of the respective method, which will not be described in detail herein.

Each of component modules, units and subunits of the above apparatuses can be configured in the form of software, firmware, hardware or combinations thereof. The specific means or ways in the configuration is known for those skilled in the art, which will not be described in detail herein. In the case that the component modules, units and subunits of the above apparatuses are implemented by software or firmware, a program constituting the software is installed from a storage medium or network onto a computer with a dedicated hardware structure (such as a general-purpose computer 1900 shown in FIG. 19), and the computer, when installed with various programs, is capable of performing various functions.

Figure 19:
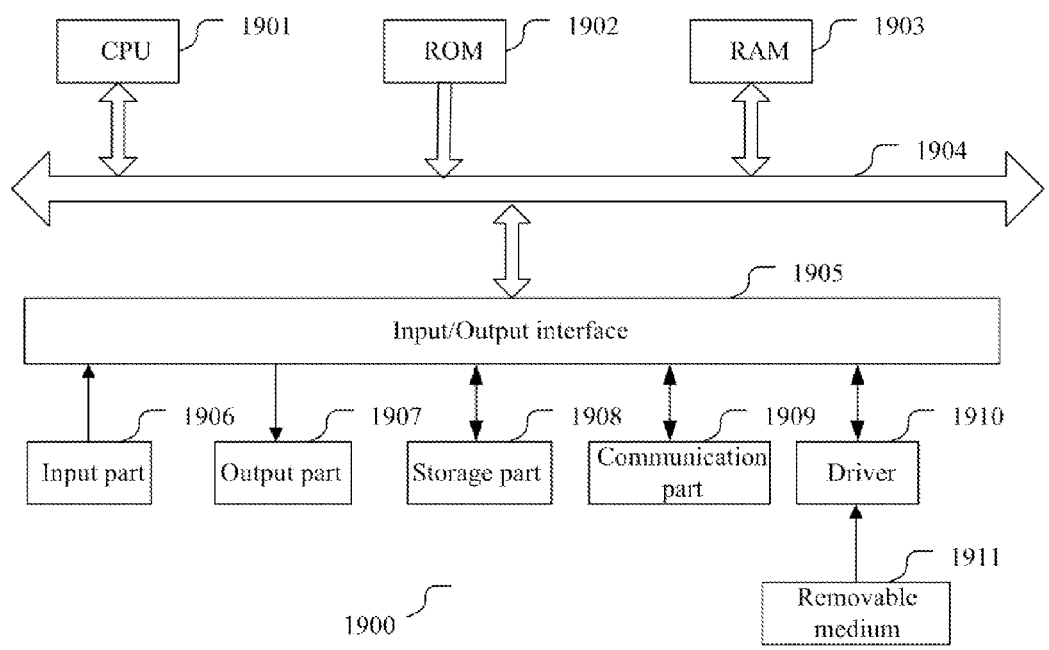
FIG. 19 shows a schematic block diagram of a computer capable of implementing the methods and apparatuses according to the embodiments of the present invention.

FIG. 19 shows a schematic block diagram of a computer capable of implementing the methods and apparatuses according to the embodiments of the present invention.

In FIG. 19, a Central Processing Unit (CPU) 1901 executes various processes according to programs stored in a Read- Only Memory (ROM) 1902 or programs loaded into a Random-Access Memory (RAM) 1930 from a storage part 1908. Data required by the CPU 1901 to execute the various processes can also be stored in the RAM 1903 as required. The CPU 1901, the ROM 1902 and the RAM 1903 are connected with each other by a bus 1904. An input/output interface 1905 is also connected to the bus 1904.

The following parts are connected to the input/output (I/O) interface 1905: an input part 1906 (including a keyboard, a mouse and etc.), an output part 1907 (including a display such as a cathode-ray tube (CRT) or a liquid crystal display (LCD), and a speaker, etc.), the storage part 1908 (including a hard disk, etc.), and a communication part 1909 (including a network interface card such as an LAN card, a MODEM and etc.). The communication part 1909 executes communication processing via a network such as the Internet. A driver 1910 can also be connected to the input/output interface 1905 as required. A removable medium 1911 such as a magnetic disk, an optical disk, a magneto-optical disk or a semiconductor memory can be mounted on the driver 1910 as required, such that the computer program read out therefrom is installed into the storage part 1908 as required.

In the case that the above series of processes are implemented based on software, a program constituting the software is installed from a network such as the Internet or from a storage medium such as the removable storage medium 1911.

It is to be understood by those skilled in the art that such storage medium is not limited to the removable medium 1911 storing programs therein and distributing the programs to a user(s) dependently from a device. Examples of the removable medium 1911 include a magnetic disk (including a Floppy Disk (FD) (registered trademark)), an optical disk (including a Compact Disk-Read Only Memory (CD-ROM) and a Digital Versatile Disc (DVD)), a magneto-optical disk (including a Microdisk (MD) (registered trademark)) and a semiconductor memory. Alternatively, the storage medium can be the ROM 1902, a hard disk contained in the storage part 1908, etc., in which programs are stored and which is distributed to a user(s) along with a device the storage medium is contained in.

The present invention also provides a program product in which machine-readable instruction codes are stored. The instruction codes, when read and executed by a machine, can execute the methods according to the embodiments of the present invention.

Accordingly, the storage medium for carrying the above program product in which the machine-readable instruction codes are stored is also included in the disclosure of the present invention. The storage medium includes but not limited to a floppy disk, a compact disc, a magneto-optical disk, a memory card and a memory stick.

In the above descriptions on the specific embodiments of the present invention, the features described/shown in one embodiment can be used in one or more other embodiments in a same or similar way, or be combined with features in other embodiments, or be used to replace features in other embodiments.

It should be noted that, the term "include/contain" in the context means the existence of a feature, an element, a step or a component, but does not exclude the presence or addition of one or more other features, elements, steps or components.

In addition, the methods of the present invention are not limited to be implemented according to the time sequence described in the disclosure, and can be implemented according to other time sequence in a parallel mode or in an independent mode. Therefore, the technical scope of the present invention is not limited to the implementation sequence of the methods of the present invention.

Experimental Results

Actual examples of a precoding matrix codebook group generated according to the method for generating the precoding matrix codebook group according to the present invention are given hereinafter. Those skilled in the art should understand that the examples are used for illustration and are not intended to limit the present invention.

Table 4 gives a precoding matrix collection for Rank=1 in a 4 transmitting antenna system. The precoding matrix collection is formed by using the method for forming a precoding matrix collection according to the embodiments of the present invention and taking QPSK constellation points as elements of the precoding matrices in the collection. The precoding matrix collection has 64 precoding matrices in all.

TABLE 4

Precoding matrix collection for Rank = 1

| 1 | 2 | 3 | 4 |
|---|---|---|---|
| 1 | 1 | 1 | 1 |
| 1 | 1i | −1 | −1i |
| 1 | 1 | 1 | 1 |
| 1 | 1 | 1 | 1 |

| 5 | 6 | 7 | 8 | 9 | 10 | 11 | 12 | 13 | 14 | 15 | 16 |
|---|---|---|---|---|---|---|---|---|---|---|---|
| 1 | 1 | 1 | 1 | 1 | 1 | 1 | 1 | 1 | 1 | 1 | 1 |
| 1 | 1i | −1 | −1i | 1 | 1i | −1 | −1i | 1 | 1i | −1 | −1i |
| 1i | 1i | 1i | 1i | −1 | −1 | −1 | −1 | −1i | −1i | −1i | −1i |
| 1 | 1 | 1 | 1 | 1 | 1 | 1 | 1 | 1 | 1 | 1 | 1 |

| 17 | 18 | 19 | 20 | 21 | 22 | 23 | 24 | 25 | 26 | 27 | 28 |
|---|---|---|---|---|---|---|---|---|---|---|---|
| 1 | 1 | 1 | 1 | 1 | 1 | 1 | 1 | 1 | 1 | 1 | 1 |
| 1 | 1i | −1 | −1i | 1 | 1i | −1 | −1i | 1 | 1i | −1 | −1i |
| 1 | 1 | 1 | 1 | 1i | 1i | 1i | 1i | −1 | −1 | −1 | −1 |
| 1i | 1i | 1i | 1i | 1i | 1i | 1i | 1i | 1i | 1i | 1i | 1i |

| 29 | 30 | 31 | 32 | 33 | 34 | 35 | 36 | 37 | 38 | 39 | 40 |
|---|---|---|---|---|---|---|---|---|---|---|---|
| 1 | 1 | 1 | 1 | 1 | 1 | 1 | 1 | 1 | 1 | 1 | 1 |
| 1 | 1i | −1 | −1i | 1 | 1i | −1 | −1i | 1 | 1i | −1 | −1i |
| −1i | −1i | −1i | −1i | 1 | 1 | 1 | 1 | 1i | 1i | 1i | 1i |
| 1i | 1i | 1i | 1i | −1 | −1 | −1 | −1 | −1 | −1 | −1 | −1 |

| 41 | 42 | 43 | 44 | 45 | 46 | 47 | 48 | 49 | 50 | 51 | 52 |
|---|---|---|---|---|---|---|---|---|---|---|---|
| 1 | 1 | 1 | 1 | 1 | 1 | 1 | 1 | 1 | 1 | 1 | 1 |
| 1 | 1i | −1 | −1i | 1 | 1i | −1 | −1i | 1 | 1i | −1 | −1i |
| −1 | −1 | −1 | −1 | −1i | −1i | −1i | −1i | 1 | 1 | 1 | 1 |
| −1 | −1 | −1 | −1 | −1 | −1 | −1 | −1 | −1i | −1i | −1i | −1i |

| 53 | 54 | 55 | 56 | 57 | 58 | 59 | 60 | 61 | 62 | 63 | 64 |
|---|---|---|---|---|---|---|---|---|---|---|---|
| 1 | 1 | 1 | 1 | 1 | 1 | 1 | 1 | 1 | 1 | 1 | 1 |
| 1 | 1i | −1 | −1i | 1 | 1i | −1 | −1i | 1 | 1i | −1 | −1i |
| 1i | 1i | 1i | 1i | −1 | −1 | −1 | −1 | −1i | −1i | −1i | −1i |
| −1i | −1i | −1i | −1i | −1i | −1i | −1i | −1i | −1i | −1i | −1i | −1i |

As an example, the precoding matrix collection shown in Table 4 can be power normalized with the following power normalization matrix:

$$A=[\tfrac{1}{2}].$$

By utilizing the precoding matrix collection in Table 4 and using the method for generating a precoding matrix codebook group according to an embodiment of the present invention, the obtained precoding matrix codebook group may be:

[16  40   6  46  52  18  58  28  31  61  55  21   3
  9  43  33  14  63  11   1  41  35  60  50  26  53
 23  38  20   8  45  32  34  36  13  44  25  49  27
 17  64  12  30  47  39  15  42   5  54  57   7  62
  4  10  19  59  56   2  51  24  29  37  22  48], or may be:

[18  28  58  52  40   6  16  46  31  21  61  55  43
  3   9  33   1  11  35  41  60  50  20  23  26  38
 14   8  29  63  36  49  27  45  54  64  57   5  44
 56  47  32  37  10   7  25  17  19  62  59  39   4
 30   2  12  24  51  22  53  15  42  13  34  48], or may be:

[ 6  40  46  16  43  33   9   3  52  28  58  18  55
 61  31  21  11  35  41   1   8  48  29  23  53  63
 20  60  14  50  22  42  54  47  17   5  39  27  25
 59  10  34  37  30  36  51  57  24  45  64   2  15
 12   7  44  49  19  56  32  62  38   4  26  13], or may be:

[61  21  31  55  18  52  28  58  40  46  16   6  33
 43   9   3  48  41   1  35  11   8  14  38  63  29
 23  53  20  60  26  50  59  17   2  10  44  36  25
 34   7  62  64  32  42  49  57  24  39  51  15   5
 54  30  27  45  13  37  56  19   4  47  12].

There are 4 numeric sequences given above, and each numeric sequence corresponds to a precoding matrix codebook group. Each number in the numeric sequences corresponds to a precoding matrix in Table 4, and represents a serial number of the precoding matrix in Table 4.

Particularly, a precoding matrix codebook (or a precoding matrix codebook group) including 16 precoding matrices may be:

[16  40   6  46  52  18  58  28  31  61  55  21   3
  9  43  33].

Each number in the numeric sequence given above corresponds to a serial number of a precoding matrix in Table 4. It should be to noted that, there is no limitation to the position of each number in the sequence of the above precoding matrix codebook having a size of 16 matrices.

Table 5 presents a precoding matrix collection for Rank=2 in a 4 transmitting antenna system. The precoding matrix collection is formed by using the method for forming a precoding matrix collection according to an embodiment of the present invention and taking QPSK constellation points as elements of the precoding matrices in the collection. The precoding matrix collection has 48 precoding matrices. There are two zeros in each column of each precoding matrix, so as to decrease a Peak-to-Average Ratio of the transmitting antennas.

TABLE 5

Precoding matrix collection for Rank = 2

| 1 | | 2 | | 3 | | 4 | | 5 | | 6 | |
|---|---|---|---|---|---|---|---|---|---|---|---|
| 1 | 0 | 1 | 0 | 1 | 0 | 1 | 0 | 1 | 0 | 1 | 0 |
| 1 | 0 | 1 | 0 | 1 | 0 | 1 | 0 | i | 0 | i | 0 |
| 0 | 1 | 0 | 1 | 0 | 1 | 0 | 1 | 0 | 1 | 0 | 1 |
| 0 | 1 | 0 | i | 0 | -1 | 0 | -1i | 0 | 1 | 0 | i |

| 7 | | 8 | | 9 | | 10 | | 11 | | 12 | |
|---|---|---|---|---|---|---|---|---|---|---|---|
| 1 | 0 | 1 | 0 | 1 | 0 | 1 | 0 | 1 | 0 | 1 | 0 |
| i | 0 | i | 0 | -1 | 0 | -1 | 0 | -1 | 0 | -1 | 0 |
| 0 | 1 | 0 | 1 | 0 | 1 | 0 | 1 | 0 | 1 | 0 | 1 |
| 0 | -1 | 0 | -1i | 0 | 1 | 0 | i | 0 | -1 | 0 | -1i |

| 13 | | 14 | | 15 | | 16 | | 17 | | 18 | |
|---|---|---|---|---|---|---|---|---|---|---|---|
| 1 | 0 | 1 | 0 | 1 | 0 | 1 | 0 | 1 | 0 | 1 | 0 |
| -1i | 0 | -1i | 0 | -1i | 0 | -1i | 0 | 0 | 1 | 0 | 1 |
| 0 | 1 | 0 | 1 | 0 | 1 | 0 | 1 | 1 | 0 | 1 | 0 |
| 0 | 1 | 0 | i | 0 | -1 | 0 | -1i | 0 | 1 | 0 | i |

| 19 | | 20 | | 21 | | 22 | | 23 | | 24 | |
|---|---|---|---|---|---|---|---|---|---|---|---|
| 1 | 0 | 1 | 0 | 1 | 0 | 1 | 0 | 1 | 0 | 1 | 0 |
| 0 | 1 | 0 | 1 | 0 | 1 | 0 | 1 | 0 | 1 | 0 | 1 |
| 1 | 0 | 1 | 0 | i | 0 | i | 0 | i | 0 | i | 0 |
| 0 | -1 | 0 | -1i | 0 | 1 | 0 | i | 0 | -1 | 0 | -1i |

| 25 | | 26 | | 27 | | 28 | | 29 | | 30 | |
|---|---|---|---|---|---|---|---|---|---|---|---|
| 1 | 0 | 1 | 0 | 1 | 0 | 1 | 0 | 1 | 0 | 1 | 0 |
| 0 | 1 | 0 | 1 | 0 | 1 | 0 | 1 | 0 | 1 | 0 | 1 |
| -1 | 0 | -1 | 0 | -1 | 0 | -1 | 0 | -1i | 0 | -1i | 0 |
| 0 | 1 | 0 | i | 0 | -1 | 0 | -1i | 0 | 1 | 0 | i |

| 31 | | 32 | | 33 | | 34 | | 35 | | 36 | |
|---|---|---|---|---|---|---|---|---|---|---|---|
| 1 | 0 | 1 | 0 | 1 | 0 | 1 | 0 | 1 | 0 | 1 | 0 |
| 0 | 1 | 0 | 1 | 0 | 1 | 0 | 1 | 0 | 1 | 0 | 1 |
| -1i | 0 | -1i | 0 | 0 | 1 | 0 | i | 0 | -1 | 0 | -1i |
| 0 | -1 | 0 | -1i | 1 | 0 | 1 | 0 | 1 | 0 | 1 | 0 |

| 37 | | 38 | | 39 | | 40 | | 41 | | 42 | |
|---|---|---|---|---|---|---|---|---|---|---|---|
| 1 | 0 | 1 | 0 | 1 | 0 | 1 | 0 | 1 | 0 | 1 | 0 |
| 0 | 1 | 0 | 1 | 0 | 1 | 0 | 1 | 0 | 1 | 0 | 1 |
| 0 | 1 | 0 | i | 0 | -1 | 0 | -1i | 0 | 1 | 0 | i |
| i | 0 | i | 0 | i | 0 | i | 0 | -1 | 0 | -1 | 0 |

| 43 | | 44 | | 45 | | 46 | | 47 | | 48 | |
|---|---|---|---|---|---|---|---|---|---|---|---|
| 1 | 0 | 1 | 0 | 1 | 0 | 1 | 0 | 1 | 0 | 1 | 0 |
| 0 | 1 | 0 | 1 | 0 | 1 | 0 | 1 | 0 | 1 | 0 | 1 |
| 0 | -1 | 0 | -1i | 0 | 1 | 0 | i | 0 | -1 | 0 | -1i |
| -1 | 0 | -1 | 0 | -1i | 0 | -1i | 0 | -1i | 0 | -1i | 0 |

As an example, the precoding matrix collection shown in FIG. 5 is normalized with the following power normalization matrix:

$$\Lambda = \begin{bmatrix} \frac{1}{2} & 0 \\ 0 & \frac{1}{2} \end{bmatrix}.$$

By utilizing the precoding matrix collection in Table 5 and using a method for generating a precoding matrix codebook group according to an embodiment of the present invention, the obtained precoding matrix codebook group may be:

[33 43 35 41 3 12 24 18 13 29 26 5 31
10 46 40 38 48 15 20 23 2 25 8 6 32
16 17 11 27 22 1 36 42 39 47 37 28 19
45 7 34 9 21 30 14 44 4], or may be:

[23 17 42 33 39 26 8 14 6 16 28 47 31
44 11 1 3 29 36 18 37 46 24 12 13 5
38 32 22 48 19 35 41 25 10 2 20 45 27
43 15 7 40 9 4 21 30 34].

There are 2 numeric sequences given above, each numeric sequence corresponding to a precoding matrix codebook group. Each number in each numeric sequence corresponds to a precoding matrix in Table 5, and represents a serial number of the precoding matrix in Table 5.

Particularly, a precoding matrix codebook (or a precoding matrix codebook group) including 16 precoding matrices may be:

[33 43 35 41 3 12 24 18 13 29 26 5 31
10 46 40], or may be:

[23 17 42 33 39 26 8 14 6 16 28 47 31
44 11 1].

Each number in the numeric sequences given above corresponds to a serial number of a precoding matrix in Table 5. It should be to noted that, there is no limitation to the position of each number in the sequences of the above precoding matrix codebooks having a size of 16 matrices.

Table 6 presents a precoding matrix collection for Rank=3 in a 4 transmitting antenna system. The precoding matrix collection is formed by using a method for forming the precoding matrix collection according to an embodiment of the present invention and taking QPSK constellation points as elements of the precoding matrices in the collection. The precoding matrix collection has 192 precoding matrices. Each precoding matrix has three columns (any) two of which respectively have two zeros, so as to decrease Peak-to-Average Ratio of the transmitting antennas.

TABLE 6

| Precoding matrix collection for Rank = 3 | | | | | | | | |
|---|---|---|---|---|---|---|---|---|
| 1 | | | 2 | | | 3 | | |
| 0.5 | 0.7071 | 0 | 0.5 | 0.7071 | 0 | 0.5 | 0.7071 | 0 |
| 0.5 | −0.7071 | 0 | 0.5 | 0 | 0.7071 | 0.5 | 0 | 0.7071 |
| 0.5 | 0 | 0.7071 | 0.5 | −0.7071 | 0 | 0.5 | 0 | −0.7071 |
| 0.5 | 0 | −0.7071 | 0.5 | 0 | −0.7071 | 0.5 | −0.7071 | 0 |
| 4 | | | 5 | | | 6 | | |
| 0.5 | 0.7071 | 0 | 0.5 | 0.7071 | 0 | 0.5 | 0.7071 | 0 |
| 0.5i | −0.7071i | 0 | 0.5i | 0 | 0.7071 | 0.5i | 0 | 0.7071 |
| 0.5 | 0 | 0.7071 | 0.5 | −0.7071 | 0 | 0.5 | 0 | 0.7071i |
| 0.5 | 0 | −0.7071 | 0.5 | 0 | 0.7071i | 0.5 | −0.7071 | 0 |
| 7 | | | 8 | | | 9 | | |
| 0.5 | 0.7071 | 0 | 0.5 | 0.7071 | 0 | 0.5 | 0.7071 | 0 |
| −0.5 | 0.7071 | 0 | −0.5 | 0 | 0.7071 | −0.5 | 0 | 0.7071 |
| 0.5 | 0 | 0.7071 | 0.5 | −0.7071 | 0 | 0.5 | 0 | 0.7071 |
| 0.5 | 0 | −0.7071 | 0.5 | 0 | 0.7071 | 0.5 | −0.7071 | 0 |
| 10 | | | 11 | | | 12 | | |
| 0.5 | 0.7071 | 0 | 0.5 | 0.7071 | 0 | 0.5 | 0.7071 | 0 |
| −0.5i | 0.7071i | 0 | −0.5i | 0 | 0.7071 | −0.5i | 0 | 0.7071 |
| 0.5 | 0 | 0.7071 | 0.5 | −0.7071 | 0 | 0.5 | 0 | −0.7071i |
| 0.5 | 0 | −0.7071 | 0.5 | 0 | −0.7071i | 0.5 | −0.7071 | 0 |
| 13 | | | 14 | | | 15 | | |
| 0.5 | 0.7071 | 0 | 0.5 | 0.7071 | 0 | 0.5 | 0.7071 | 0 |
| 0.5 | −0.7071 | 0 | 0.5 | 0 | 0.7071 | 0.5 | 0 | 0.7071 |
| 0.5i | 0 | 0.7071 | 0.5i | −0.7071i | 0 | 0.5i | 0 | −0.7071i |
| 0.5 | 0 | 0.7071i | 0.5 | 0 | −0.7071 | 0.5 | −0.7071 | 0 |
| 16 | | | 17 | | | 18 | | |
| 0.5 | 0.7071 | 0 | 0.5 | 0.7071 | 0 | 0.5 | 0.7071 | 0 |
| 0.5i | −0.7071i | 0 | 0.5i | 0 | 0.7071 | 0.5i | 0 | 0.7071 |
| 0.5i | 0 | 0.7071 | 0.5i | −0.7071i | 0 | 0.5i | 0 | −0.7071 |
| 0.5 | 0 | 0.7071i | 0.5 | 0 | 0.7071i | 0.5 | −0.7071 | 0 |

TABLE 6-continued

Precoding matrix collection for Rank = 3

| 19 | | | 20 | | | 21 | | |
|---|---|---|---|---|---|---|---|---|
| 0.5 | 0.7071 | 0 | 0.5 | 0.7071 | 0 | 0.5 | 0.7071 | 0 |
| −0.5 | 0.7071 | 0 | −0.5 | 0 | 0.7071 | −0.5 | 0 | 0.7071 |
| 0.5i | 0 | 0.7071 | 0.5i | −0.7071i | 0 | 0.5i | 0 | 0.7071i |
| 0.5 | 0 | 0.7071i | 0.5 | 0 | 0.7071 | 0.5 | −0.7071 | 0 |

| 22 | | | 23 | | | 24 | | |
|---|---|---|---|---|---|---|---|---|
| 0.5 | 0.7071 | 0 | 0.5 | 0.7071 | 0 | 0.5 | 0.7071 | 0 |
| −0.5i | 0.7071i | 0 | −0.5i | 0 | 0.7071 | −0.5i | 0 | 0.7071 |
| 0.5i | 0 | 0.7071 | 0.5i | −0.7071i | 0 | 0.5i | 0 | 0.7071 |
| 0.5 | 0 | 0.7071i | 0.5 | 0 | −0.7071i | 0.5 | −0.7071 | 0 |

| 25 | | | 26 | | | 27 | | |
|---|---|---|---|---|---|---|---|---|
| 0.5 | 0.7071 | 0 | 0.5 | 0.7071 | 0 | 0.5 | 0.7071 | 0 |
| 0.5 | −0.7071 | 0 | 0.5 | 0 | 0.7071 | 0.5 | 0 | 0.7071 |
| −0.5 | 0 | 0.7071 | −0.5 | 0.7071 | 0 | −0.5 | 0 | 0.7071 |
| 0.5 | 0 | 0.7071 | 0.5 | 0 | −0.7071 | 0.5 | −0.7071 | 0 |

| 28 | | | 29 | | | 30 | | |
|---|---|---|---|---|---|---|---|---|
| 0.5 | 0.7071 | 0 | 0.5 | 0.7071 | 0 | 0.5 | 0.7071 | 0 |
| 0.5i | −0.7071i | 0 | 0.5i | 0 | 0.7071 | 0.5i | 0 | 0.7071 |
| −0.5 | 0 | 0.7071 | −0.5 | 0.7071 | 0 | −0.5 | 0 | −0.7071i |
| 0.5 | 0 | 0.7071 | 0.5 | 0 | 0.7071i | 0.5 | −0.7071 | 0 |

| 31 | | | 32 | | | 33 | | |
|---|---|---|---|---|---|---|---|---|
| 0.5 | 0.7071 | 0 | 0.5 | 0.7071 | 0 | 0.5 | 0.7071 | 0 |
| −0.5 | 0.7071 | 0 | −0.5 | 0 | 0.7071 | −0.5 | 0 | 0.7071 |
| −0.5 | 0 | 0.7071 | −0.5 | 0.7071 | 0 | −0.5 | 0 | −0.7071 |
| 0.5 | 0 | 0.7071 | 0.5 | 0 | 0.7071 | 0.5 | −0.7071 | 0 |

| 34 | | | 35 | | | 36 | | |
|---|---|---|---|---|---|---|---|---|
| 0.5 | 0.7071 | 0 | 0.5 | 0.7071 | 0 | 0.5 | 0.7071 | 0 |
| −0.5i | 0.7071i | 0 | −0.5i | 0 | 0.7071 | −0.5i | 0 | 0.7071 |
| −0.5 | 0 | 0.7071 | −0.5 | 0.7071 | 0 | −0.5 | 0 | 0.7071i |
| 0.5 | 0 | 0.7071 | 0.5 | 0 | −0.7071i | 0.5 | −0.7071 | 0 |

| 37 | | | 38 | | | 39 | | |
|---|---|---|---|---|---|---|---|---|
| 0.5 | 0.7071 | 0 | 0.5 | 0.7071 | 0 | 0.5 | 0.7071 | 0 |
| 0.5 | −0.7071 | 0 | 0.5 | 0 | 0.7071 | 0.5 | 0 | 0.7071 |
| −0.5i | 0 | 0.7071 | −0.5i | 0.7071i | 0 | −0.5i | 0 | 0.7071i |
| 0.5 | 0 | −0.7071i | 0.5 | 0 | −0.7071 | 0.5 | −0.7071 | 0 |

| 40 | | | 41 | | | 42 | | |
|---|---|---|---|---|---|---|---|---|
| 0.5 | 0.7071 | 0 | 0.5 | 0.7071 | 0 | 0.5 | 0.7071 | 0 |
| 0.5i | −0.7071i | 0 | 0.5i | 0 | 0.7071 | 0.5i | 0 | 0.7071 |
| −0.5i | 0 | 0.7071 | −0.5i | 0.7071i | 0 | −0.5i | 0 | 0.7071 |
| 0.5 | 0 | −0.7071i | 0.5 | 0 | 0.7071i | 0.5 | −0.7071 | 0 |

| 43 | | | 44 | | | 45 | | |
|---|---|---|---|---|---|---|---|---|
| 0.5 | 0.7071 | 0 | 0.5 | 0.7071 | 0 | 0.5 | 0.7071 | 0 |
| −0.5 | 0.7071 | 0 | −0.5 | 0 | 0.7071 | −0.5 | 0 | 0.7071 |
| −0.5i | 0 | 0.7071 | −0.5i | 0.7071i | 0 | −0.5i | 0 | −0.7071i |
| 0.5 | 0 | −0.7071i | 0.5 | 0 | 0.7071 | 0.5 | −0.7071 | 0 |

| 46 | | | 47 | | | 48 | | |
|---|---|---|---|---|---|---|---|---|
| 0.5 | 0.7071 | 0 | 0.5 | 0.7071 | 0 | 0.5 | 0.7071 | 0 |
| −0.5i | 0.7071i | 0 | −0.5i | 0 | 0.7071 | −0.5i | 0 | 0.7071 |
| −0.5i | 0 | 0.7071 | −0.5i | 0.7071i | 0 | −0.5i | 0 | −0.7071 |
| 0.5 | 0 | −0.7071i | 0.5 | 0 | −0.7071i | 0.5 | −0.7071 | 0 |

| 49 | | | 50 | | | 51 | | |
|---|---|---|---|---|---|---|---|---|
| 0.5 | 0.7071 | 0 | 0.5 | 0.7071 | 0 | 0.5 | 0.7071 | 0 |
| 0.5 | −0.7071 | 0 | 0.5 | 0 | 0.7071 | 0.5 | 0 | 0.7071 |
| 0.5 | 0 | 0.7071 | 0.5 | −0.7071 | 0 | 0.5 | 0 | −0.7071 |
| 0.5i | 0 | −0.7071i | 0.5i | 0 | −0.7071i | 0.5i | −0.7071i | 0 |

TABLE 6-continued

Precoding matrix collection for Rank = 3

| 52 | | | 53 | | | 54 | | |
|---|---|---|---|---|---|---|---|---|
| 0.5 | 0.7071 | 0 | 0.5 | 0.7071 | 0 | 0.5 | 0.7071 | 0 |
| 0.5i | −0.7071i | 0 | 0.5i | 0 | 0.7071 | 0.5i | 0 | 0.7071 |
| 0.5 | 0 | 0.7071 | 0.5 | −0.7071 | 0 | 0.5 | 0 | 0.7071i |
| 0.5i | 0 | −0.7071i | 0.5i | 0 | −0.7071 | 0.5i | −0.7071i | 0 |

| 55 | | | 56 | | | 57 | | |
|---|---|---|---|---|---|---|---|---|
| 0.5 | 0.7071 | 0 | 0.5 | 0.7071 | 0 | 0.5 | 0.7071 | 0 |
| −0.5 | 0.7071 | 0 | −0.5 | 0 | 0.7071 | −0.5 | 0 | 0.7071 |
| 0.5 | 0 | 0.7071 | 0.5 | −0.7071 | 0 | 0.5 | 0 | 0.7071 |
| 0.5i | 0 | −0.7071i | 0.5i | 0 | 0.7071i | 0.5i | −0.7071i | 0 |

| 58 | | | 59 | | | 60 | | |
|---|---|---|---|---|---|---|---|---|
| 0.5 | 0.7071 | 0 | 0.5 | 0.7071 | 0 | 0.5 | 0.7071 | 0 |
| −0.5i | 0.7071i | 0 | −0.5i | 0 | 0.7071 | −0.5i | 0 | 0.7071 |
| 0.5 | 0 | 0.7071 | 0.5 | −0.7071 | 0 | 0.5 | 0 | −0.7071i |
| 0.5i | 0 | −0.7071i | 0.5i | 0 | 0.7071 | 0.5i | −0.7071i | 0 |

| 61 | | | 62 | | | 63 | | |
|---|---|---|---|---|---|---|---|---|
| 0.5 | 0.7071 | 0 | 0.5 | 0.7071 | 0 | 0.5 | 0.7071 | 0 |
| 0.5 | −0.7071 | 0 | 0.5 | 0 | 0.7071 | 0.5 | 0 | 0.7071 |
| 0.5i | 0 | 0.7071 | 0.5i | −0.7071i | 0 | 0.5i | 0 | −0.7071i |
| 0.5i | 0 | −0.7071 | 0.5i | 0 | −0.7071i | 0.5i | −0.7071i | 0 |

| 64 | | | 65 | | | 66 | | |
|---|---|---|---|---|---|---|---|---|
| 0.5 | 0.7071 | 0 | 0.5 | 0.7071 | 0 | 0.5 | 0.7071 | 0 |
| 0.5i | −0.7071i | 0 | 0.5i | 0 | 0.7071 | 0.5i | 0 | 0.7071 |
| 0.5i | 0 | 0.7071 | 0.5i | −0.7071i | 0 | 0.5i | 0 | −0.7071 |
| 0.5i | 0 | −0.7071 | 0.5i | 0 | −0.7071 | 0.5i | −0.7071i | 0 |

| 67 | | | 68 | | | 69 | | |
|---|---|---|---|---|---|---|---|---|
| 0.5 | 0.7071 | 0 | 0.5 | 0.7071 | 0 | 0.5 | 0.7071 | 0 |
| −0.5 | 0.7071 | 0 | −0.5 | 0 | 0.7071 | −0.5 | 0 | 0.7071 |
| 0.5i | 0 | 0.7071 | 0.5i | −0.7071i | 0 | 0.5i | 0 | 0.7071i |
| 0.5i | 0 | −0.7071 | 0.5i | 0 | 0.7071i | 0.5i | −0.7071i | 0 |

| 70 | | | 71 | | | 72 | | |
|---|---|---|---|---|---|---|---|---|
| 0.5 | 0.7071 | 0 | 0.5 | 0.7071 | 0 | 0.5 | 0.7071 | 0 |
| −0.5i | 0.7071i | 0 | −0.5i | 0 | 0.7071 | −0.5i | 0 | 0.7071 |
| 0.5i | 0 | 0.7071 | 0.5i | −0.7071i | 0 | 0.5i | 0 | 0.7071 |
| 0.5i | 0 | −0.7071 | 0.5i | 0 | 0.7071 | 0.5i | −0.7071i | 0 |

| 73 | | | 74 | | | 75 | | |
|---|---|---|---|---|---|---|---|---|
| 0.5 | 0.7071 | 0 | 0.5 | 0.7071 | 0 | 0.5 | 0.7071 | 0 |
| 0.5 | −0.7071 | 0 | 0.5 | 0 | 0.7071 | 0.5 | 0 | 0.7071 |
| −0.5 | 0 | 0.7071 | −0.5 | 0.7071 | 0 | −0.5 | 0 | 0.7071 |
| 0.5i | 0 | 0.7071i | 0.5i | 0 | −0.7071i | 0.5i | −0.7071i | 0 |

| 76 | | | 77 | | | 78 | | |
|---|---|---|---|---|---|---|---|---|
| 0.5 | 0.7071 | 0 | 0.5 | 0.7071 | 0 | 0.5 | 0.7071 | 0 |
| 0.5i | −0.7071i | 0 | 0.5i | 0 | 0.7071 | 0.5i | 0 | 0.7071 |
| −0.5 | 0 | 0.7071 | −0.5 | 0.7071 | 0 | −0.5 | 0 | −0.7071i |
| 0.5i | 0 | 0.7071i | 0.5i | 0 | −0.7071 | 0.5i | −0.7071i | 0 |

| 79 | | | 80 | | | 81 | | |
|---|---|---|---|---|---|---|---|---|
| 0.5 | 0.7071 | 0 | 0.5 | 0.7071 | 0 | 0.5 | 0.7071 | 0 |
| −0.5 | 0.7071 | 0 | −0.5 | 0 | 0.7071 | −0.5 | 0 | 0.7071 |
| −0.5 | 0 | 0.7071 | −0.5 | 0.7071 | 0 | −0.5 | 0 | −0.7071 |
| 0.5i | 0 | 0.7071i | 0.5i | 0 | 0.7071i | 0.5i | −0.7071i | 0 |

| 82 | | | 83 | | | 84 | | |
|---|---|---|---|---|---|---|---|---|
| 0.5 | 0.7071 | 0 | 0.5 | 0.7071 | 0 | 0.5 | 0.7071 | 0 |
| −0.5i | 0.7071i | 0 | −0.5i | 0 | 0.7071 | −0.5i | 0 | 0.7071 |
| −0.5 | 0 | 0.7071 | −0.5 | 0.7071 | 0 | −0.5 | 0 | 0.7071i |
| 0.5i | 0 | 0.7071i | 0.5i | 0 | 0.7071 | 0.5i | −0.7071i | 0 |

TABLE 6-continued

Precoding matrix collection for Rank = 3

| 85 | | | 86 | | | 87 | | |
|---|---|---|---|---|---|---|---|---|
| 0.5 | 0.7071 | 0 | 0.5 | 0.7071 | 0 | 0.5 | 0.7071 | 0 |
| 0.5 | −0.7071 | 0 | 0.5 | 0 | 0.7071 | 0.5 | 0 | 0.7071 |
| −0.5i | 0 | 0.7071 | −0.5i | 0.7071i | 0 | −0.5i | 0 | 0.7071i |
| 0.5i | 0 | 0.7071 | 0.5i | 0 | −0.7071i | 0.5i | −0.7071i | 0 |

| 88 | | | 89 | | | 90 | | |
|---|---|---|---|---|---|---|---|---|
| 0.5 | 0.7071 | 0 | 0.5 | 0.7071 | 0 | 0.5 | 0.7071 | 0 |
| 0.5i | −0.7071i | 0 | 0.5i | 0 | 0.7071 | 0.5i | 0 | 0.7071 |
| −0.5i | 0 | 0.7071 | −0.5i | 0.7071i | 0 | −0.5i | 0 | 0.7071 |
| 0.5i | 0 | 0.7071 | 0.5i | 0 | −0.7071 | 0.5i | −0.7071i | 0 |

| 91 | | | 92 | | | 93 | | |
|---|---|---|---|---|---|---|---|---|
| 0.5 | 0.7071 | 0 | 0.5 | 0.7071 | 0 | 0.5 | 0.7071 | 0 |
| −0.5 | 0.7071 | 0 | −0.5 | 0 | 0.7071 | −0.5 | 0 | 0.7071 |
| −0.5i | 0 | 0.7071 | −0.5i | 0.7071i | 0 | −0.5i | 0 | −0.7071i |
| 0.5i | 0 | 0.7071 | 0.5i | 0 | 0.7071i | 0.5i | −0.7071i | 0 |

| 94 | | | 95 | | | 96 | | |
|---|---|---|---|---|---|---|---|---|
| 0.5 | 0.7071 | 0 | 0.5 | 0.7071 | 0 | 0.5 | 0.7071 | 0 |
| −0.5i | 0.7071i | 0 | −0.5i | 0 | 0.7071 | −0.5i | 0 | 0.7071 |
| −0.5i | 0 | 0.7071 | −0.5i | 0.7071i | 0 | −0.5i | 0 | −0.7071 |
| 0.5i | 0 | 0.7071 | 0.5i | 0 | 0.7071 | 0.5i | −0.7071i | 0 |

| 97 | | | 98 | | | 99 | | |
|---|---|---|---|---|---|---|---|---|
| 0.5 | 0.7071 | 0 | 0.5 | 0.7071 | 0 | 0.5 | 0.7071 | 0 |
| 0.5 | −0.7071 | 0 | 0.5 | 0 | 0.7071 | 0.5 | 0 | 0.7071 |
| 0.5 | 0 | 0.7071 | 0.5 | −0.7071 | 0 | 0.5 | 0 | −0.7071 |
| −0.5 | 0 | 0.7071 | −0.5 | 0 | 0.7071 | −0.5 | 0.7071 | 0 |

| 100 | | | 101 | | | 102 | | |
|---|---|---|---|---|---|---|---|---|
| 0.5 | 0.7071 | 0 | 0.5 | 0.7071 | 0 | 0.5 | 0.7071 | 0 |
| 0.5i | −0.7071i | 0 | 0.5i | 0 | 0.7071 | 0.5i | 0 | 0.7071 |
| 0.5 | 0 | 0.7071 | 0.5 | −0.7071 | 0 | 0.5 | 0 | 0.7071i |
| −0.5 | 0 | 0.7071 | −0.5 | 0 | −0.7071i | −0.5 | 0.7071 | 0 |

| 103 | | | 104 | | | 105 | | |
|---|---|---|---|---|---|---|---|---|
| 0.5 | 0.7071 | 0 | 0.5 | 0.7071 | 0 | 0.5 | 0.7071 | 0 |
| −0.5 | 0.7071 | 0 | −0.5 | 0 | 0.7071 | −0.5 | 0 | 0.7071 |
| 0.5 | 0 | 0.7071 | 0.5 | −0.7071 | 0 | 0.5 | 0 | 0.7071 |
| −0.5 | 0 | 0.7071 | −0.5 | 0 | −0.7071 | −0.5 | 0.7071 | 0 |

| 106 | | | 107 | | | 108 | | |
|---|---|---|---|---|---|---|---|---|
| 0.5 | 0.7071 | 0 | 0.5 | 0.7071 | 0 | 0.5 | 0.7071 | 0 |
| −0.5i | 0.7071i | 0 | −0.5i | 0 | 0.7071 | −0.5i | 0 | 0.7071 |
| 0.5 | 0 | 0.7071 | 0.5 | −0.7071 | 0 | 0.5 | 0 | −0.7071i |
| −0.5 | 0 | 0.7071 | −0.5 | 0 | 0.7071i | −0.5 | 0.7071 | 0 |

| 109 | | | 110 | | | 111 | | |
|---|---|---|---|---|---|---|---|---|
| 0.5 | 0.7071 | 0 | 0.5 | 0.7071 | 0 | 0.5 | 0.7071 | 0 |
| 0.5 | −0.7071 | 0 | 0.5 | 0 | 0.7071 | 0.5 | 0 | 0.7071 |
| 0.5i | 0 | 0.7071 | 0.5i | −0.7071i | 0 | 0.5i | 0 | −0.7071i |
| −0.5 | 0 | −0.7071i | −0.5 | 0 | 0.7071 | −0.5 | 0.7071 | 0 |

| 112 | | | 113 | | | 114 | | |
|---|---|---|---|---|---|---|---|---|
| 0.5 | 0.7071 | 0 | 0.5 | 0.7071 | 0 | 0.5 | 0.7071 | 0 |
| 0.5i | −0.7071i | 0 | 0.5i | 0 | 0.7071 | 0.5i | 0 | 0.7071 |
| 0.5i | 0 | 0.7071 | 0.5i | −0.7071i | 0 | 0.5i | 0 | −0.7071 |
| −0.5 | 0 | −0.7071i | −0.5 | 0 | −0.7071i | −0.5 | 0.7071 | 0 |

| 115 | | | 116 | | | 117 | | |
|---|---|---|---|---|---|---|---|---|
| 0.5 | 0.7071 | 0 | 0.5 | 0.7071 | 0 | 0.5 | 0.7071 | 0 |
| −0.5 | 0.7071 | 0 | −0.5 | 0 | 0.7071 | −0.5 | 0 | 0.7071 |
| 0.5i | 0 | 0.7071 | 0.5i | −0.7071 | 0 | 0.5i | 0 | 0.7071i |
| −0.5 | 0 | −0.7071i | −0.5 | 0 | −0.7071 | −0.5 | 0.7071 | 0 |

TABLE 6-continued

Precoding matrix collection for Rank = 3

| 118 | | | 119 | | | 120 | | |
|---|---|---|---|---|---|---|---|---|
| 0.5 | 0.7071 | 0 | 0.5 | 0.7071 | 0 | 0.5 | 0.7071 | 0 |
| −0.5i | 0.7071i | 0 | −0.5i | 0 | 0.7071 | −0.5i | 0 | 0.7071 |
| 0.5i | 0 | 0.7071 | 0.5i | −0.7071i | 0 | 0.5i | 0 | 0.7071 |
| −0.5 | 0 | −0.7071i | −0.5 | 0 | 0.7071i | −0.5 | 0.7071 | 0 |

| 121 | | | 122 | | | 123 | | |
|---|---|---|---|---|---|---|---|---|
| 0.5 | 0.7071 | 0 | 0.5 | 0.7071 | 0 | 0.5 | 0.7071 | 0 |
| 0.5 | −0.7071 | 0 | 0.5 | 0 | 0.7071 | 0.5 | 0 | 0.7071 |
| −0.5 | 0 | 0.7071 | −0.5 | 0.7071 | 0 | −0.5 | 0 | 0.7071 |
| −0.5 | 0 | −0.7071 | −0.5 | 0 | 0.7071 | −0.5 | 0.7071 | 0 |

| 124 | | | 125 | | | 126 | | |
|---|---|---|---|---|---|---|---|---|
| 0.5 | 0.7071 | 0 | 0.5 | 0.7071 | 0 | 0.5 | 0.7071 | 0 |
| 0.5i | −0.7071i | 0 | 0.5i | 0 | 0.7071 | 0.5i | 0 | 0.7071 |
| −0.5 | 0 | 0.7071 | −0.5 | 0.7071 | 0 | −0.5 | 0 | −0.7071i |
| −0.5 | 0 | −0.7071 | −0.5 | 0 | −0.7071i | −0.5 | 0.7071 | 0 |

| 127 | | | 128 | | | 129 | | |
|---|---|---|---|---|---|---|---|---|
| 0.5 | 0.7071 | 0 | 0.5 | 0.7071 | 0 | 0.5 | 0.7071 | 0 |
| −0.5 | 0.7071 | 0 | −0.5 | 0 | 0.7071 | −0.5 | 0 | 0.7071 |
| −0.5 | 0 | 0.7071 | −0.5 | 0.7071 | 0 | −0.5 | 0 | −0.7071 |
| −0.5 | 0 | −0.7071 | −0.5 | 0 | −0.7071 | −0.5 | 0.7071 | 0 |

| 130 | | | 131 | | | 132 | | |
|---|---|---|---|---|---|---|---|---|
| 0.5 | 0.7071 | 0 | 0.5 | 0.7071 | 0 | 0.5 | 0.7071 | 0 |
| −0.5i | 0.7071i | 0 | −0.5i | 0 | 0.7071 | −0.5i | 0 | 0.7071 |
| −0.5 | 0 | 0.7071 | −0.5 | 0.7071 | 0 | −0.5 | 0 | 0.7071i |
| −0.5 | 0 | −0.7071 | −0.5 | 0 | 0.7071i | −0.5 | 0.7071 | 0 |

| 133 | | | 134 | | | 135 | | |
|---|---|---|---|---|---|---|---|---|
| 0.5 | 0.7071 | 0 | 0.5 | 0.7071 | 0 | 0.5 | 0.7071 | 0 |
| 0.5 | −0.7071 | 0 | 0.5 | 0 | 0.7071 | 0.5 | 0 | 0.7071 |
| −0.5i | 0 | 0.7071 | −0.5i | 0.7071i | 0 | −0.5i | 0 | 0.7071i |
| −0.5 | 0 | 0.7071i | −0.5 | 0 | 0.7071 | −0.5 | 0.7071 | 0 |

| 136 | | | 137 | | | 138 | | |
|---|---|---|---|---|---|---|---|---|
| 0.5 | 0.7071 | 0 | 0.5 | 0.7071 | 0 | 0.5 | 0.7071 | 0 |
| 0.5i | −0.7071i | 0 | 0.5i | 0 | 0.7071 | 0.5i | 0 | 0.7071 |
| −0.5i | 0 | 0.7071 | −0.5i | 0.7071i | 0 | −0.5i | 0 | 0.7071 |
| −0.5 | 0 | 0.7071i | −0.5 | 0 | −0.7071i | −0.5 | 0.7071 | 0 |

| 139 | | | 140 | | | 141 | | |
|---|---|---|---|---|---|---|---|---|
| 0.5 | 0.7071 | 0 | 0.5 | 0.7071 | 0 | 0.5 | 0.7071 | 0 |
| −0.5 | 0.7071 | 0 | −0.5 | 0 | 0.7071 | −0.5 | 0 | 0.7071 |
| −0.5i | 0 | 0.7071 | −0.5i | 0.7071i | 0 | −0.5i | 0 | −0.7071i |
| −0.5 | 0 | 0.7071i | −0.5 | 0 | −0.7071 | −0.5 | 0.7071 | 0 |

| 142 | | | 143 | | | 144 | | |
|---|---|---|---|---|---|---|---|---|
| 0.5 | 0.7071 | 0 | 0.5 | 0.7071 | 0 | 0.5 | 0.7071 | 0 |
| −0.5i | 0.7071i | 0 | −0.5i | 0 | 0.7071 | −0.5i | 0 | 0.7071 |
| −0.5i | 0 | 0.7071 | −0.5i | 0.7071i | 0 | −0.5i | 0 | −0.7071 |
| −0.5 | 0 | 0.7071i | −0.5 | 0 | 0.7071 | −0.5 | 0.7071 | 0 |

| 145 | | | 146 | | | 147 | | |
|---|---|---|---|---|---|---|---|---|
| 0.5 | 0.7071 | 0 | 0.5 | 0.7071 | 0 | 0.5 | 0.7071 | 0 |
| 0.5 | −0.7071 | 0 | 0.5 | 0 | 0.7071 | 0.5 | 0 | 0.7071 |
| 0.5 | 0 | 0.7071 | 0.5 | −0.7071 | 0 | 0.5 | 0 | −0.7071 |
| −0.5i | 0 | 0.7071i | −0.5i | 0 | 0.7071i | −0.5i | 0.7071i | 0 |

| 148 | | | 149 | | | 150 | | |
|---|---|---|---|---|---|---|---|---|
| 0.5 | 0.7071 | 0 | 0.5 | 0.7071 | 0 | 0.5 | 0.7071 | 0 |
| 0.5i | −0.7071i | 0 | 0.5i | 0 | 0.7071 | 0.5i | 0 | 0.7071 |
| 0.5 | 0 | 0.7071 | 0.5 | −0.7071 | 0 | 0.5 | 0 | 0.7071i |
| −0.5i | 0 | 0.7071i | −0.5i | 0 | 0.7071 | −0.5i | 0.7071i | 0 |

TABLE 6-continued

Precoding matrix collection for Rank = 3

| 151 | | | 152 | | | 153 | | |
|---|---|---|---|---|---|---|---|---|
| 0.5 | 0.7071 | 0 | 0.5 | 0.7071 | 0 | 0.5 | 0.7071 | 0 |
| −0.5 | 0.7071 | 0 | −0.5 | 0 | 0.7071 | −0.5 | 0 | 0.7071 |
| 0.5 | 0 | 0.7071 | 0.5 | −0.7071 | 0 | 0.5 | 0 | 0.7071 |
| −0.5i | 0 | 0.7071i | −0.5i | 0 | −0.7071i | −0.5i | 0.7071i | 0 |

| 154 | | | 155 | | | 156 | | |
|---|---|---|---|---|---|---|---|---|
| 0.5 | 0.7071 | 0 | 0.5 | 0.7071 | 0 | 0.5 | 0.7071 | 0 |
| −0.5i | 0.7071i | 0 | −0.5i | 0 | 0.7071 | −0.5i | 0 | 0.7071 |
| 0.5 | 0 | 0.7071 | 0.5 | −0.7071 | 0 | 0.5 | 0 | −0.7071i |
| −0.5i | 0 | 0.7071i | −0.5i | 0 | −0.7071 | −0.5i | 0.7071i | 0 |

| 157 | | | 158 | | | 159 | | |
|---|---|---|---|---|---|---|---|---|
| 0.5 | 0.7071 | 0 | 0.5 | 0.7071 | 0 | 0.5 | 0.7071 | 0 |
| 0.5 | −0.7071 | 0 | 0.5 | 0 | 0.7071 | 0.5 | 0 | 0.7071 |
| 0.5i | 0 | 0.7071 | 0.5i | −0.7071i | 0 | 0.5i | 0 | −0.7071i |
| −0.5i | 0 | 0.7071 | −0.5i | 0 | 0.7071i | −0.5i | 0.7071i | 0 |

| 160 | | | 161 | | | 162 | | |
|---|---|---|---|---|---|---|---|---|
| 0.5 | 0.7071 | 0 | 0.5 | 0.7071 | 0 | 0.5 | 0.7071 | 0 |
| 0.5i | −0.7071i | 0 | 0.5i | 0 | 0.7071 | 0.5i | 0 | 0.7071 |
| 0.5i | 0 | 0.7071 | 0.5i | −0.7071i | 0 | 0.5i | 0 | −0.7071 |
| −0.5i | 0 | 0.7071 | −0.5i | 0 | 0.7071 | −0.5i | 0.7071i | 0 |

| 163 | | | 164 | | | 165 | | |
|---|---|---|---|---|---|---|---|---|
| 0.5 | 0.7071 | 0 | 0.5 | 0.7071 | 0 | 0.5 | 0.7071 | 0 |
| −0.5 | 0.7071 | 0 | −0.5 | 0 | 0.7071 | −0.5 | 0 | 0.7071 |
| 0.5i | 0 | 0.7071 | 0.5i | −0.7071i | 0 | 0.5i | 0 | 0.7071i |
| −0.5i | 0 | 0.7071 | −0.5i | 0 | −0.7071i | −0.5i | 0.7071i | 0 |

| 166 | | | 167 | | | 168 | | |
|---|---|---|---|---|---|---|---|---|
| 0.5 | 0.7071 | 0 | 0.5 | 0.7071 | 0 | 0.5 | 0.7071 | 0 |
| −0.5i | 0.7071i | 0 | −0.5i | 0 | 0.7071 | −0.5i | 0 | 0.7071 |
| 0.5i | 0 | 0.7071 | 0.5i | −0.7071i | 0 | 0.5i | 0 | 0.7071 |
| −0.5i | 0 | 0.7071 | −0.5i | 0 | 0 | −0.5i | 0.7071i | 0 |

| 169 | | | 170 | | | 171 | | |
|---|---|---|---|---|---|---|---|---|
| 0.5 | 0.7071 | 0 | 0.5 | 0.7071 | 0 | 0.5 | 0.7071 | 0 |
| 0.5 | −0.7071 | 0 | 0.5 | 0 | 0.7071 | 0.5 | 0 | 0.7071 |
| −0.5 | 0 | 0.7071 | −0.5 | 0.7071 | 0 | −0.5 | 0 | 0.7071 |
| −0.5i | 0 | −0.7071i | −0.5i | 0 | 0.7071i | −0.5i | 0.7071i | 0 |

| 172 | | | 173 | | | 174 | | |
|---|---|---|---|---|---|---|---|---|
| 0.5 | 0.7071 | 0 | 0.5 | 0.7071 | 0 | 0.5 | 0.7071 | 0 |
| 0.5i | −0.7071i | 0 | 0.5i | 0 | 0.7071 | 0.5i | 0 | 0.7071 |
| −0.5 | 0 | 0.7071 | −0.5 | 0.7071 | 0 | −0.5 | 0 | −0.7071i |
| −0.5i | 0 | −0.7071i | −0.5i | 0 | 0.7071 | −0.5i | 0.7071i | 0 |

| 175 | | | 176 | | | 177 | | |
|---|---|---|---|---|---|---|---|---|
| 0.5 | 0.7071 | 0 | 0.5 | 0.7071 | 0 | 0.5 | 0.7071 | 0 |
| −0.5 | 0.7071 | 0 | −0.5 | 0 | 0.7071 | −0.5 | 0 | 0.7071 |
| −0.5 | 0 | 0.7071 | −0.5 | 0.7071 | 0 | −0.5 | 0 | −0.7071 |
| −0.5i | 0 | −0.7071i | −0.5i | 0 | −0.7071i | −0.5i | 0.7071i | 0 |

| 178 | | | 179 | | | 180 | | |
|---|---|---|---|---|---|---|---|---|
| 0.5 | 0.7071 | 0 | 0.5 | 0.7071 | 0 | 0.5 | 0.7071 | 0 |
| −0.5i | 0.7071i | 0 | −0.5i | 0 | 0.7071 | −0.5i | 0 | 0.7071 |
| −0.5 | 0 | 0.7071 | −0.5 | 0.7071 | 0 | −0.5 | 0 | 0.7071i |
| −0.5i | 0 | −0.7071i | −0.5i | 0 | −0.7071 | −0.5i | 0.7071i | 0 |

| 181 | | | 182 | | | 183 | | |
|---|---|---|---|---|---|---|---|---|
| 0.5 | 0.7071 | 0 | 0.5 | 0.7071 | 0 | 0.5 | 0.7071 | 0 |
| 0.5 | −0.7071 | 0 | 0.5 | 0 | 0.7071 | 0.5 | 0 | 0.7071 |
| −0.5i | 0 | 0.7071 | −0.5i | 0.7071i | 0 | −0.5i | 0 | 0.7071i |
| −0.5i | 0 | −0.7071 | −0.5i | 0 | 0.7071i | −0.5i | 0.7071i | 0 |

TABLE 6-continued

| Precoding matrix collection for Rank = 3 | | | | | | | | |
|---|---|---|---|---|---|---|---|---|
| 184 | | | 185 | | | 186 | | |
| 0.5 | 0.7071 | 0 | 0.5 | 0.7071 | 0 | 0.5 | 0.7071 | 0 |
| 0.5i | −0.7071i | 0 | 0.5i | 0 | 0.7071 | 0.5i | 0 | 0.7071 |
| −0.5i | 0 | 0.7071 | −0.5i | 0.7071i | 0 | −0.5i | 0 | 0.7071 |
| −0.5i | 0 | −0.7071 | −0.5i | 0 | 0.7071 | −0.5i | 0.7071i | 0 |
| 187 | | | 188 | | | 189 | | |
| 0.5 | 0.7071 | 0 | 0.5 | 0.7071 | 0 | 0.5 | 0.7071 | 0 |
| −0.5 | 0.7071 | 0 | −0.5 | 0 | 0.7071 | −0.5 | 0 | 0.7071 |
| −0.5i | 0 | 0.7071 | −0.5i | 0.7071i | 0 | −0.5i | 0 | −0.7071i |
| −0.5i | 0 | −0.7071 | −0.5i | 0 | −0.7071i | −0.5i | 0.7071i | 0 |
| 190 | | | 191 | | | 192 | | |
| 0.5 | 0.7071 | 0 | 0.5 | 0.7071 | 0 | 0.5 | 0.7071 | 0 |
| −0.5i | 0.7071i | 0 | −0.5i | 0 | 0.7071 | −0.5i | 0 | 0.7071 |
| −0.5i | 0 | 0.7071 | −0.5i | 0.7071i | 0 | −0.5i | 0 | −0.7071 |
| −0.5i | 0 | −0.7071 | −0.5i | 0 | −0.7071 | −0.5i | 0.7071i | 0 |

As an example, in the case that the power of each of the transmission layers is required to be the same, the precoding matrix collection shown in Table 6 is power normalized with the following power normalization matrix:

$$\Lambda = \begin{bmatrix} \frac{1}{\sqrt{3}} & 0 & 0 \\ 0 & \frac{1}{\sqrt{3}} & 0 \\ 0 & 0 & \frac{1}{\sqrt{3}} \end{bmatrix}.$$

As an example, in the case that the power of each of the transmission layers is required to be not the same, the precoding matrix collection shown in Table 6 is power normalized with the power normalization matrices shown in FIG. 7.

TABLE 7

| Power normalization matrices in which diagonal elements are not the same | | |
|---|---|---|
| SNR = 7 dB | | SNR = 9 dB |
| $\begin{bmatrix} \sqrt{0.3209} & 0 & 0 \\ 0 & \sqrt{0.33955} & 0 \\ 0 & 0 & \sqrt{0.33955} \end{bmatrix}$ | | $\begin{bmatrix} \sqrt{0.3312} & 0 & 0 \\ 0 & \sqrt{0.3344} & 0 \\ 0 & 0 & \sqrt{0.3344} \end{bmatrix}$ |
| SNR = 11 dB | SNR = 13 dB | SNR = 15 dB |
| $\begin{bmatrix} \sqrt{0.329} & 0 & 0 \\ 0 & \sqrt{0.3355} & 0 \\ 0 & 0 & \sqrt{0.3355} \end{bmatrix}$ | $\begin{bmatrix} \sqrt{0.3275} & 0 & 0 \\ 0 & \sqrt{0.33625} & 0 \\ 0 & 0 & \sqrt{0.33625} \end{bmatrix}$ | $\begin{bmatrix} \sqrt{0.3325} & 0 & 0 \\ 0 & \sqrt{0.33375} & 0 \\ 0 & 0 & \sqrt{0.33375} \end{bmatrix}$ |

By utilizing the precoding matrix collection in Table 6 and the above power normalization matrix in which diagonal elements are the same, the obtained precoding matrix codebook group may be:

```
[36    6  108    5  115  133   10   28  161   89  191   71   51
171  153   81   13   43  130  100  176   74  107  126  167  139
 95  185   65   37  109   19   75  177   57   30   12  132  102
147  184   80   50  106  170   64  152   34   70   20   39  160
 56  190   21   14   88   38   93  134  186   44  175   66  116
 99  156  125   35   73   27  157   48   55  174  146  120    1
180   94  131  110  140  151  144  101   84   79   54  112   29
 18   11  121   60   78  138  166  150    9  159   49  129    4
187  142   68   22  179   92   62  169  163  168  123  124  164
122   16  149  188   26   42   85  114  158  104   32   15   91
182   58    2  136   86   40  117   96  189  127   46  128   82
 24  145    8  162   90    3  135   52  137   72  141  155    7
 45   61  173   25   59  143  113  111  103  181  183  118  172
 98  154   97   83   33   41   47  119  192   17   76  148   77
178   69   67  105  165   53   87   31   23   63].
```

There is one numeric sequence given above. The numeric sequence corresponds to a precoding matrix codebook group. Each number in the numeric sequence corresponds to a precoding matrix in Table 6, and represents a serial number of the precoding matrix in Table 6.

Particularly, a precoding matrix codebook (or a precoding matrix codebook group) including 20 precoding matrices may be:

```
[36    6  108    5  115  133   10   28  161   89  191   71   51
171  153   81   13   43  130  100].
```

Each number in the above numeric sequence corresponds to a serial number of a precoding matrix in Table 6. It should be to noted that, there is no limitation to the position of each number in the sequence of the above precoding matrix codebook having a size of 20 matrices.

Particularly, a precoding matrix codebook (or a precoding matrix codebook group) including 23 precoding matrices may be:

```
[36    6  108    5  115  133   10   28  161   89  191   71   51
171  153   81   13   43  130  100  176   74  107].
```

Each number in the above numeric sequence corresponds to a serial number of a precoding matrix in Table 6. It should be to noted that, there is no limitation to the position of each number in the sequence of the above precoding matrix codebook having a size of 23 matrices.

The above is the precoding matrix codebook groups for Rank=1, 2, 3 designed by the method for generating a precoding matrix codebook group according to the embodiments of the present invention, and particularly gives the precoding matrix codebooks in the case that the number of the precoding matrices is determined.

A codebook group for Rank=4 can adopt a codebook in which the number of precoding matrix element is 1, i.e. the precoding matrix is an identity matrix.

Although the present invention has been disclosed with reference to descriptions for the specific embodiments of the present invention, it should be understood that all of the above mentioned embodiments and examples are illustrative instead of limiting. Those skilled in the art can devise various modifications, improvements or equivalents for the present invention, within the spirit and scope of the appended claims. The modifications, improvements or equivalents should also be considered as being included in the protection scope of the present invention.

The invention claimed is:

1. A method for generating a precoding matrix codebook group for a multi-antenna communication system, the method comprising: a channel matrix set generating step: generating a channel matrix set including N channel matrices, wherein N is an integer larger than 1 and each of the channel matrices corresponds to a channel instance; a performance parameter matrix generating step: generating a M×N performance parameter matrix TP based on the channel matrix set and a precoding matrix collection including M precoding matrices, wherein M is a positive integer, each row of the performance parameter matrix TP represents values of a performance parameter of the communication system associated with the same precoding matrix, and each column of the performance parameter matrix TP represents the values of the performance parameter associated with the same channel matrix; and a precoding matrix codebook group generating step: ordering, based on the performance parameter matrix TP, the precoding matrices in the precoding matrix collection according to a contribution made by each of the precoding matrices to the performance parameter of the communication system to obtain an ordered precoding matrix collection as the precoding matrix codebook group, wherein in the precoding matrix codebook group, the precoding matrix making a first largest contribution to the performance parameter of the communication system forms a precoding matrix codebook having a size of 1 matrix, and first K precoding matrices respectively making a first largest to a $K^{th}$ largest contribution to the performance parameter of the communication system form a precoding matrix codebook having a size of K matrices, wherein K is an integer and 1<K≤M, and wherein the performance parameter is throughput, and the performance parameter matrix generating step comprises: determining a Signal to Interference and Noise Ratio (SINR) of the communication system; calculating, based on the SINR, a posteriori Signal to Noise Ratio (SNR) vector of the communication system corresponding to each precoding matrix in the precoding matrix collection, with respect to the channel instance corresponding to each channel matrix in the channel matrix set to obtain M×N posteriori SNR vectors; transforming the posteriori SNR vectors into values of the throughput of the communication system; and arranging all the values of the throughput into a M×N throughput matrix TP, wherein in the throughput matrix TP, each row represents the values of the throughput associated with the same precoding matrix, each column represents the values of the throughput associated with the same channel matrix, and each element represents a value of the throughput of the communication system when the precoding matrix associated with the row in which the element lies is used under the channel instance corresponding to the channel matrix associated with the column in which the element lies.

2. The method of claim 1, wherein the precoding matrix codebook group generating step comprises:
performing a first-level precoding matrix ordering sub-process on the performance parameter matrix TP to determine a precoding matrix which makes a first least contribution to the performance parameter of the communication system;
performing a second-level to a $M^{th}$-level precoding matrix ordering sub-process sequentially to determine M−1 precoding matrices which make a second least to a $M^{th}$ least contribution to the performance parameter of the communication system respectively; and
ordering all the precoding matrices in the precoding matrix collection according to the contribution made by each of the precoding matrices to the performance parameter of the communication system to obtain the ordered precoding matrix collection.

3. The method of claim 2, wherein taking the performance parameter matrix TP as a first-level performance parameter matrix $TP_1$, a $K^{th}$-level precoding matrix ordering sub-process comprises the following steps, wherein K is an integer and 1<K≤M:
A) deleting an $i^{th}$ row of a $K^{th}$-level performance parameter matrix $TP_K$ to obtain a (M−K)×N performance parameter matrix $TP_{Ki}$, wherein i is an integer and 1≤i≤M+1−K;
B) adding the maximum value of each of the columns of the performance parameter matrix $TP_{Ki}$ to obtain a value as a performance parameter value of the performance parameter matrix $TP_{Ki}$;
C) repeatedly performing steps A) and B) for M+1−K times to obtain M+1−K performance parameter values of the performance parameter matrix $TP_{Ki}$, wherein a different row of the performance parameter matrix $TP_K$ is deleted each time;
D) determining the precoding matrix associated with a deleted row corresponding to the largest one of the M+1−K performance parameter values, as a precoding matrix making a $K^{th}$ least contribution to the parameter of the communication system; and
E) deleting the row corresponding to the largest one of the M+1−K performance parameter values from the $K^{th}$-level performance parameter matrix $TP_K$ to obtain a (M−K)×N performance parameter matrix as a $(K+1)^{th}$-level performance parameter matrix.

4. The method of claim 1, wherein the precoding matrix codebook group generating step comprises:
performing a first-level precoding matrix ordering sub-process on the performance parameter matrix TP to determine a precoding matrix which makes a first largest contribution to the performance parameter of the communication system;
performing a second-level to a $M^{th}$-level precoding matrix ordering sub-process sequentially to determine M−1 precoding matrices which make a second largest to a $M^{th}$ largest contribution to the performance parameter of the communication system respectively; and
ordering the precoding matrices in the precoding matrix collection according to the contribution made by each of the precoding matrices to the performance parameter to obtain the ordered precoding matrix collection.

5. The method of claim 4, wherein taking the performance parameter matrix TP as a first-level performance parameter matrix $TP_1$, the $K^{th}$-level precoding matrix ordering sub-process comprises the following steps, wherein K is an integer and 1<K≤M:
A) combining an $i^{th}$ row of a $K^{th}$-level performance parameter matrix $TP_K$ and K−1 rows of the performance parameter matrix TP associated with the precoding matrices which make a first largest to a $(K−1)^{th}$ largest contribution to the performance parameter of the communication system to form a K×N performance parameter matrix $TP_{Ki}$, wherein i is an integer and 1≤i≤M+1−K;
B) adding the maximum value of each of the columns of the performance parameter matrix $TP_{Ki}$ to obtain a value as a performance parameter value of the performance parameter matrix $TP_{Ki}$;
C) repeatedly performing steps A) and B) for M+1−K times to obtain M+1−K performance parameter values of the performance parameter matrix $TP_{Ki}$, wherein a different row of the performance parameter matrix $TP_K$ is deleted each time;
D) determining the precoding matrix associated with a selected row corresponding to the largest one of the M+1−K performance parameter values, as a precoding matrix making a $K^{th}$ largest contribution to the parameter of the communication system; and
E) deleting the row corresponding to the largest one of the M+1−K performance parameter values from the $K^{th}$-level performance parameter matrix $TP_K$ to obtain a (M−K)×N performance parameter matrix as a $(K+1)^{th}$-level performance parameter matrix.

6. The method of claim 1, wherein each of the precoding matrices in the precoding matrix collection has a form of [1, 1, . . . 1; $x_{11}, x_{12}, \ldots, x_{1q}$; $x_{21}, x_{22}, \ldots, x_{2q}$; . . . , . . . , . . . ; $x_{p1}, x_{p2}, \ldots, x_{pq}$], wherein p is an integer and 1≤p≤P, q is an integer and 1≤q≤Q, P represents the number of transmitting antennas of the communication system, and Q represents a rank of the communication system; and the precoding matrix collection is formed of at least one of the following precoding matrices satisfying the form: a precoding matrix formed by at least one column of a Discrete Fourier Transform (DFT) matrix, a precoding matrix formed by at least one column of a Hadamard matrix, a precoding matrix formed by Quadrature Phase-Shift Keying (QPSK) constellation points as elements, a precoding matrix formed by 8-PSK constellation points as an elements, and a precoding matrix formed by 16-PSK constellation points as elements.

7. The method of claim 1, wherein before the channel matrix set generating step, each of the precoding matrices in the precoding matrix collection is power normalized with a power normalization matrix that is a diagonal matrix in which the elements at a principal diagonal are not completely the same.

8. A method for specifying a precoding matrix for a multi-antenna communication system, wherein the multi-antenna communication system comprises at least one base station and at least one mobile station, the method comprising: a precoding matrix selecting step: selecting, by the base station from at least one precoding matrix codebook group stored on the base station, a precoding matrix to be specified for communication between the base station and the mobile station, according to information of a signal received from the mobile station, wherein each precoding matrix codebook group corresponds to a transmission layer of the communication system; a downlink signaling generating step: generating, based on the selected precoding matrix, downlink signaling which contains information indicating the selected precoding matrix; and a downlink signaling transmitting step: transmitting the generated downlink signaling to the mobile station, wherein all precoding matrices in each precoding matrix codebook group are ordered according to a contribution made by each of the precoding matrices in a precoding matrix collection having a size of M matrices to a performance parameter of the communication system, M being a positive integer, wherein in the precoding matrix codebook group, the precoding matrix making a first largest contribution to the performance parameter of the communication system forms a precoding matrix codebook having a size of 1 matrix, and first K precoding matrices respectively making a first largest to a $K^{th}$ largest contribution to the performance parameter of the communication system form a precoding matrix codebook having a size of K matrices, wherein K is an integer and $1<K \leq M$, and wherein the precoding matrix selecting step comprises: selecting, from a precoding matrix number allocation table stored on the base station, a precoding matrix number allocation solution corresponding to a Signal to Noise Ratio (SNR) of the received signal according to the SNR, wherein the precoding matrix number allocation table contains a correspondence relationship between SNRs and the number of precoding matrices to be allocated to each transmission layer of the communication system; selecting, from the respective precoding matrix codebook group corresponding to each transmission layer, a precoding matrix codebook having a size as the number of the precoding matrices to be allocated to the transmission layer, according to the selected precoding matrix number allocation solution; and selecting, from a precoding matrix set formed of the precoding matrices in the selected precoding matrix codebook, a precoding matrix which allows the performance parameter of a current channel used for the communication between the mobile station and the base station to be maximum.

9. The method of claim 8, wherein the downlink signaling generating step comprises:
carrying information indicating the selected precoding matrix number allocation solution and information indicating the selected precoding matrix onto the downlink signaling.

10. A data transmission method for a multi-antenna communication system, wherein the multi-antenna communication system comprises at least one base station and at least one mobile station, the method comprising: a downlink signaling receiving step: receiving, by the mobile station, downlink signaling from the base station, wherein the downlink signaling contains information indicating a precoding matrix specified by the base station and to be used for communication between the base station and the mobile station; a precoding matrix obtaining step: obtaining, from at least one precoding matrix codebook group stored on the mobile station, the precoding matrix according to the information indicating the precoding matrix, wherein each precoding matrix codebook group corresponds to a transmission layer of the communication system; and a precoding step: precoding data to be transmitted to the base station by using the obtained precoding matrix, wherein all precoding matrices in each precoding matrix codebook group are ordered according to a contribution made by each of the precoding matrices in a precoding matrix collection having a size of M matrices to a performance parameter of the communication system, M being a positive integer, wherein in the precoding matrix codebook group, the precoding matrix making a first largest contribution to the performance parameter of the communication system forms a precoding matrix codebook having a size of 1 matrix, and first K precoding matrices respectively making a first largest to a $K^{th}$ largest contribution to the performance parameter of the communication system form a precoding matrix codebook having a size of K matrices, wherein K is an integer and $1<K \leq M$, and wherein the downlink signaling also contains information indicating a precoding matrix number allocation solution presenting the number of precoding matrices to be allocated to each transmission layer of the communication system; and the precoding matrix obtaining step comprises: obtaining, from a precoding matrix number allocation table stored on the mobile station, the precoding matrix number allocation solution according to the information indicating the precoding matrix number allocation solution, wherein the precoding matrix number allocation table contains a correspondence relationship between Signal to Noise Ratios (SNRs) and the number of precoding matrices to be allocated to each transmission layer of the communication system; selecting, from the respective precoding matrix codebook group corresponding to each transmission layer, a precoding matrix codebook having a size as the number of the precoding matrices to be allocated to the transmission layer, according to the obtained precoding matrix number allocation solution; and obtaining, from a precoding matrix set formed of the precoding matrices in the selected precoding matrix codebook, the precoding matrix according to the information indicating the precoding matrix specified by the base station.

11. An apparatus for generating a precoding matrix codebook group for a multi-antenna communication system, the apparatus comprising: a channel matrix set generating unit, configured to generate a channel matrix set including N channel matrices, wherein N is an integer larger than 1 and each of the channel matrices corresponds to a channel instance; a performance parameter matrix generating unit, configured to generate a M×N performance parameter matrix TP based on the channel matrix set and a precoding matrix collection including M precoding matrices, wherein M is a positive integer, each row of the performance parameter matrix TP represents values of a performance parameter of the communication system associated with the same precoding matrix, and each column of the performance parameter matrix TP represents the values of the performance parameter associated with the same channel matrix; and a precoding matrix codebook group generating unit, configured to order, based on the performance parameter matrix TP, the precoding matrices in the precoding matrix collection according to the contribution made by each of the precoding matrices to the performance parameter of the communication system to obtain an ordered precoding matrix collection as the precoding matrix codebook group, wherein in the precoding matrix codebook group, the precoding matrix making a first largest contribution to the performance parameter of the communication system forms a precoding matrix codebook having a size of 1 matrix, and first K precoding matrices respectively making a first largest to a $K^{th}$ largest contribution to the performance parameter of the communication system form a precoding matrix codebook having a size of K matrices, wherein K is an integer and 1<K≤M, and wherein the performance parameter is throughput, and the performance parameter matrix generating unit comprises: a Signal to Interference and Noise Ratio (SINR) determining unit, configured to determine a SINR of the communication system; a posteriori Signal to Noise Ratio (SNR) vector calculating unit, configured to calculate, based on the SINR, a posteriori SNR vector of the communication system corresponding to each precoding matrix in the precoding matrix collection, with respect to the channel instance corresponding to each channel matrix in the channel matrix set to obtain M×N posteriori SNR vectors; a throughput matrix generating unit, configured to transform the posteriori SNR vectors into values of the throughput of the communication system, and arrange all the values of the throughput into a M×N throughput matrix TP, wherein in the throughput matrix TP, each row represents the values of the throughput associated with the same precoding matrix, each column represents the values of the throughput associated with the same channel matrix, and each element represents a value of the throughput of the communication system when the precoding matrix associated with the row in which the element lies is used under the channel instance corresponding to the channel matrix associated with the column in which the element lies.

12. The apparatus of claim 11, wherein the precoding matrix codebook group generating unit comprises:
a precoding matrix contribution determining subunit, configured to perform a first-level precoding matrix ordering sub-process on the performance parameter matrix TP to determine a precoding matrix which makes a first least contribution to the performance parameter of the communication system, and perform a second-level to a $K^{th}$-level precoding matrix ordering sub-process sequentially to determine M−1 precoding matrices which make a second least to a $M^{th}$ least contribution to the performance parameter of the communication system respectively; and
a precoding matrix arranging subunit, configured to order the precoding matrices in the precoding matrix collection according to the contribution made by each of the precoding matrices to the performance parameter of the communication system to obtain the ordered precoding matrix collection.

13. The apparatus of claim 12, wherein the precoding matrix contribution determining subunit is further configured to take the performance parameter matrix TP as a first-level performance parameter matrix $TP_1$, and perform the $K^{th}$-level precoding matrix ordering sub-process in the following way, wherein K is an integer and 1<K≤M:
A) deleting an $i^{th}$ row of a $K^{th}$-level performance parameter matrix $TP_K$ to obtain a (M−K)×N performance parameter matrix $TP_{Ki}$, wherein i is an integer and 1≤i≤M+1−K;
B) adding the maximum value of each of the columns of the performance parameter matrix $TP_{Ki}$ to obtain a value as a performance parameter value of the performance parameter matrix $TP_{Ki}$;
C) repeatedly performing steps A) and B) for M+1−K times to obtain M+1−K performance parameter values of the performance parameter matrix $TP_{Ki}$, wherein a different row of the performance parameter matrix $TP_K$ is deleted each time;
D) determining the precoding matrix associated with a deleted row corresponding to the largest one of the M+1−K performance parameter values, as a precoding matrix making a $K^{th}$ least contribution to the parameter of the communication system; and
E) deleting the row corresponding to the largest one of the M+1−K performance parameter values from the $K^{th}$-level performance parameter matrix $TP_K$ to obtain a (M−K)×N performance parameter matrix as a $(K+1)^{th}$-level performance parameter matrix.

14. The apparatus of claim 11, wherein the precoding matrix codebook group generating unit comprises:
a precoding matrix contribution determining subunit, configured to perform a first-level precoding matrix ordering sub-process on the performance parameter matrix TP to determine a precoding matrix which makes a first largest contribution to the performance parameter of the communication system, and perform a second-level to a $K^{th}$-level precoding matrix ordering sub-process sequentially to determine M−1 precoding matrices which make a second largest to a $M^{th}$ largest contribution to the performance parameter of the communication system respectively; and
a precoding matrix arranging subunit, configured to order the precoding matrices in the precoding matrix collection according to the contribution made by each of the precoding matrices to the performance parameter to obtain the ordered precoding matrix collection.

15. The apparatus of claim 14, wherein the precoding matrix contribution determining subunit is further configured to take the performance parameter matrix TP as a first-level performance parameter matrix $TP_1$, and perform the $K^{th}$-level precoding matrix ordering sub-process in the following way, wherein K is an integer and 1<K≤M:
A) combining an $i^{th}$ row of a $K^{th}$-level performance parameter matrix $TP_K$ and K−1 rows of the performance parameter matrix TP associated with the precoding matrices which make a first largest to a $(K−1)^{th}$ largest contribution to the performance parameter of the communication to form a K×N performance parameter matrix $TP_{Ki}$, wherein i is an integer and 1≤i≤M+1−K;
B) adding the maximum value of each of the columns of the performance parameter matrix $TP_{Ki}$ to obtain a value as a performance parameter value of the performance parameter matrix $TP_{Ki}$;
C) repeatedly performing steps A) and B) for M+1−K times to obtain M+1−K performance parameter values of the performance parameter matrix $TP_{Ki}$, wherein a different row of the performance parameter matrix $TP_K$ is deleted each time;
D) determining the precoding matrix associated with a selected row corresponding to the largest one of the M+1−K performance parameter values, as a precoding matrix making a $K^{th}$ largest contribution to the parameter of the communication system; and
E) deleting the row corresponding to the largest one of the M+1−K performance parameter values from the $K^{th}$-level performance parameter matrix $TP_K$ to obtain a (M−K)×N performance parameter matrix as a $(K+1)^{th}$-level performance parameter matrix.

16. The apparatus of claim 11, further comprising a precoding matrix collection forming unit, wherein the precoding matrix collection forming unit is configured to determine a precoding matrix form as $[1, 1, \ldots 1; x_{11}, x_{12}, \ldots, x_{1q}; x_{21}, x_{22}, \ldots, x_{2q}; \ldots, \ldots, \ldots; x_{p1}, x_{p2}, \ldots, x_{pq}]$, wherein p is an integer and 1≤p≤P, q is an integer and 1≤q≤Q, P represents the number of transmitting antennas of the communication system, and Q represents a rank of the communication system; and the precoding matrix collection is formed of at least one of the following precoding matrices satisfying the form:

a precoding matrix formed by at least one column of a Discrete Fourier Transform (DFT) matrix, a precoding matrix formed by at least one column of a Hadamard matrix, a precoding matrix formed by Quadrature Phase-Shift Keying (QPSK) constellation points as elements, a precoding matrix formed by 8-PSK constellation points as an elements, and a precoding matrix formed by 16-PSK constellation points as elements.

17. The apparatus of claim 11, further comprising a power normalizing unit, wherein the power normalizing unit is configured to normalize each of the precoding matrices in the precoding matrix collection with a power normalization matrix that is a diagonal matrix in which the elements at a principal diagonal are not completely the same.

18. A base station for a multi-antenna communication system, wherein the multi-antenna communication system comprises the base station and at least one mobile station, the base station comprising: a storing unit, configured to store at least one precoding matrix codebook group, wherein each precoding matrix codebook group corresponds to a transmission layer of the communication system; a precoding matrix selecting unit, configured to select, from the precoding matrix codebook group stored on the storing unit, a precoding matrix to be specified for the communication between the base station and the mobile station, according to information of a signal received from the mobile station; a downlink signaling generating unit, configured to generate, based on the selected precoding matrix, downlink signaling which contains information indicating the selected precoding matrix; and a downlink signaling transmitting unit, configured to transmit the generated downlink signaling to the mobile station, wherein all precoding matrices in each precoding matrix codebook group are ordered according to a contribution made by each of the precoding matrices in a precoding matrix collection having a size of M matrices to a performance parameter of the communication system, M being a positive integer, wherein in the precoding matrix codebook group, the precoding matrix making a first largest contribution to the performance parameter of the communication system forms a precoding matrix codebook having a size of 1 matrix, and first K precoding matrices respectively making a first largest to a $K^{th}$ largest contribution to the performance parameter of the communication system form a precoding matrix codebook having a size of K matrices, wherein K is an integer and $1<K \leq M$, and wherein the storing unit is further configured to store a precoding matrix number allocation table containing a correspondence relationship between Signal to Noise Ratios (SNRs) and the number of precoding matrices to be allocated to each transmission layer of the communication system; and the precoding matrix selecting unit comprises: a precoding matrix number allocation solution selecting subunit, configured to select, from the precoding matrix number allocation table stored on the storing unit, a precoding matrix number allocation solution corresponding to a SNR of the signal received by the base station according to the SNR; a precoding matrix codebook selecting subunit, configured to select, from the respective precoding matrix codebook group corresponding to each transmission layer, a precoding matrix codebook having a size as the number of the precoding matrices to be allocated to the transmission layer, according to the selected precoding matrix number allocation solution; and a precoding matrix selecting subunit, configured to select, from a precoding matrix set formed of the precoding matrices in the selected precoding matrix codebook, a precoding matrix which allows the performance parameter of a current channel used for the communication between the mobile station and the base station to be maximum.

19. The base station of claim 18, wherein the downlink signaling generating unit is also configured to carry information indicating the selected precoding matrix number allocation solution and information indicating the selected precoding matrix onto the downlink signaling.

20. A mobile station for a multi-antenna communication system, wherein the multi-antenna communication system comprises the mobile station and at least one base station, the mobile station comprising: a storing unit, configured to store at least one precoding matrix codebook group, wherein each precoding matrix codebook group corresponds to a transmission layer of the communication system; a downlink signaling receiving unit, configured to receive downlink signaling from the base station, wherein the downlink signaling contains information indicating a precoding matrix specified by the base station and to be used for communication between the base station and the mobile station; a precoding matrix obtaining unit, configured to obtain, from the precoding matrix codebook group stored on the storing unit, the precoding matrix according to the information indicating the precoding matrix; and a precoding unit, configured to precode data to be transmitted to the base station by using the obtained precoding matrix, wherein all precoding matrices in each precoding matrix codebook group are ordered according to a contribution made by each of the precoding matrices in a precoding matrix collection having a size of M matrices to a performance parameter of the communication system, M being a positive integer, wherein in the precoding matrix codebook group, the precoding matrix making a first largest contribution to the performance parameter of the communication system forms a precoding matrix codebook having a size of 1 matrix, and first K precoding matrices respectively making a first largest to a $K^{th}$ largest contribution to the performance parameter of the communication system form a precoding matrix codebook having a size of K matrices, wherein K is an integer and $1<K \leq M$, and wherein the downlink signaling also contains information indicating a precoding matrix number allocation solution presenting the number of precoding matrices to be allocated to each transmission layer of the communication system; the storing unit is further configured to store a precoding matrix number allocation table containing a correspondence relationship between Signaling Noise Rations (SNRs) and the number of precoding matrices to be allocated to each transmission layer of the communication system; and the precoding matrix obtaining unit comprises: a precoding matrix number allocation solution obtaining subunit, configured to obtain, from the precoding matrix number allocation table stored on the storing unit, the precoding matrix number allocation solution according to the information indicating the precoding matrix number allocation solution; a precoding matrix selecting subunit, configured to select, from the respective precoding matrix codebook group corresponding to each transmission layer, a precoding matrix codebook having a size as the number of the precoding matrices to be allocated to the transmission layer, according to the precoding matrix number allocation solution obtained by the precoding matrix number allocation solution obtaining subunit; and a precoding matrix obtaining subunit, configured to obtain, from a precoding matrix set formed of the precoding matrices in the precoding matrix codebook selected by the precoding matrix selecting subunit, the precoding matrix according to the information indicating the precoding matrix specified by the base station.

* * * * *